United States Patent [19]
Tomioka

[11] Patent Number: 5,452,115
[45] Date of Patent: Sep. 19, 1995

[54] COMMUNICATIONS SYSTEM

[75] Inventor: Tazuko Tomioka, Tokyo, Japan

[73] Assignee: Kabushiki Kaisha Toshiba, Kawasaki, Japan

[21] Appl. No.: 231,647

[22] Filed: Apr. 22, 1994

[30] Foreign Application Priority Data

Apr. 22, 1993 [JP] Japan .................................. 5-096196
Dec. 28, 1993 [JP] Japan .................................. 5-351173

[51] Int. Cl.[6] .......................... H04J 4/00; H04J 14/00
[52] U.S. Cl. ..................... 359/123; 359/125; 359/137
[58] Field of Search ............... 359/114, 121, 123, 125, 359/137, 168, 178, 110; 370/50

[56] References Cited

FOREIGN PATENT DOCUMENTS 0512642 11/1992 European Pat. Off. ............ 359/123

OTHER PUBLICATIONS

Chipalkatti et al., "High Speed Communication Protocols for Optical Star Coupler Using WDM", IEEE INFOCOM '92: Conference on Computer Communications pp. 2124–2133, vol. 3, 4–8 May 1992,
IEEE Journal on Selected Areas Commun. vol. 8, pp. 1048–1057, Aug. 1990, "A Media-Access Protocol for Packet-Switched Wavelength Divison Multiaccess Metropolitan Area Networks", M. Chen, et al.
Comput. Commun. Rev., vol. 22, No. 4, pp. 2–13, (1992), "An Efficient Communication Protocol for High-Speed Packet-Switched Multichannel Networks", Pierre A. Humblet.

Primary Examiner—Leo H. Boudreau
Assistant Examiner—Kinfe-Michael Negash
Attorney, Agent, or Firm—Oblon, Spivak, McClelland, Maier & Neustadt

[57] ABSTRACT

A communication system comprises a wavelength multiplexing network having a plurality of transmission channels of different wavelengths, a plurality of nodes interconnected by the wavelength multiplexing network for performing data communications with other nodes using time slots into which time on each of the transmission channels is divided, each of the nodes having its transmitting wavelength fixed and unique to a node and its receiving wavelength set tunable, and a network controller for centrally controlling time slot allocation repeated for each frame to the nodes.

15 Claims, 27 Drawing Sheets

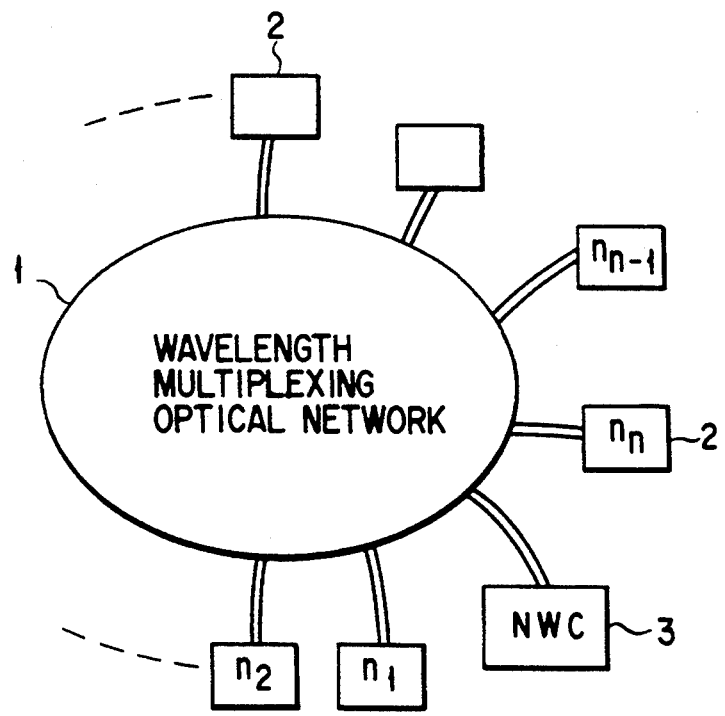
F I G. 1A
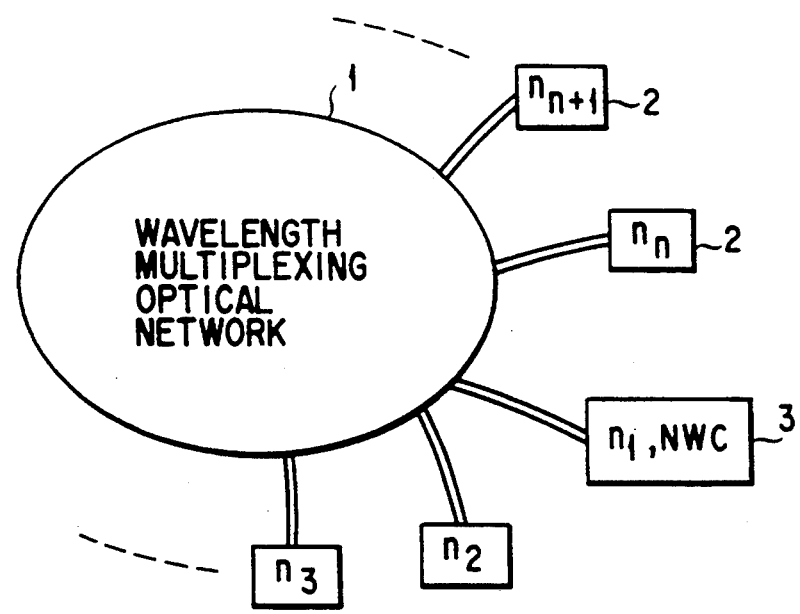
F I G. 1B

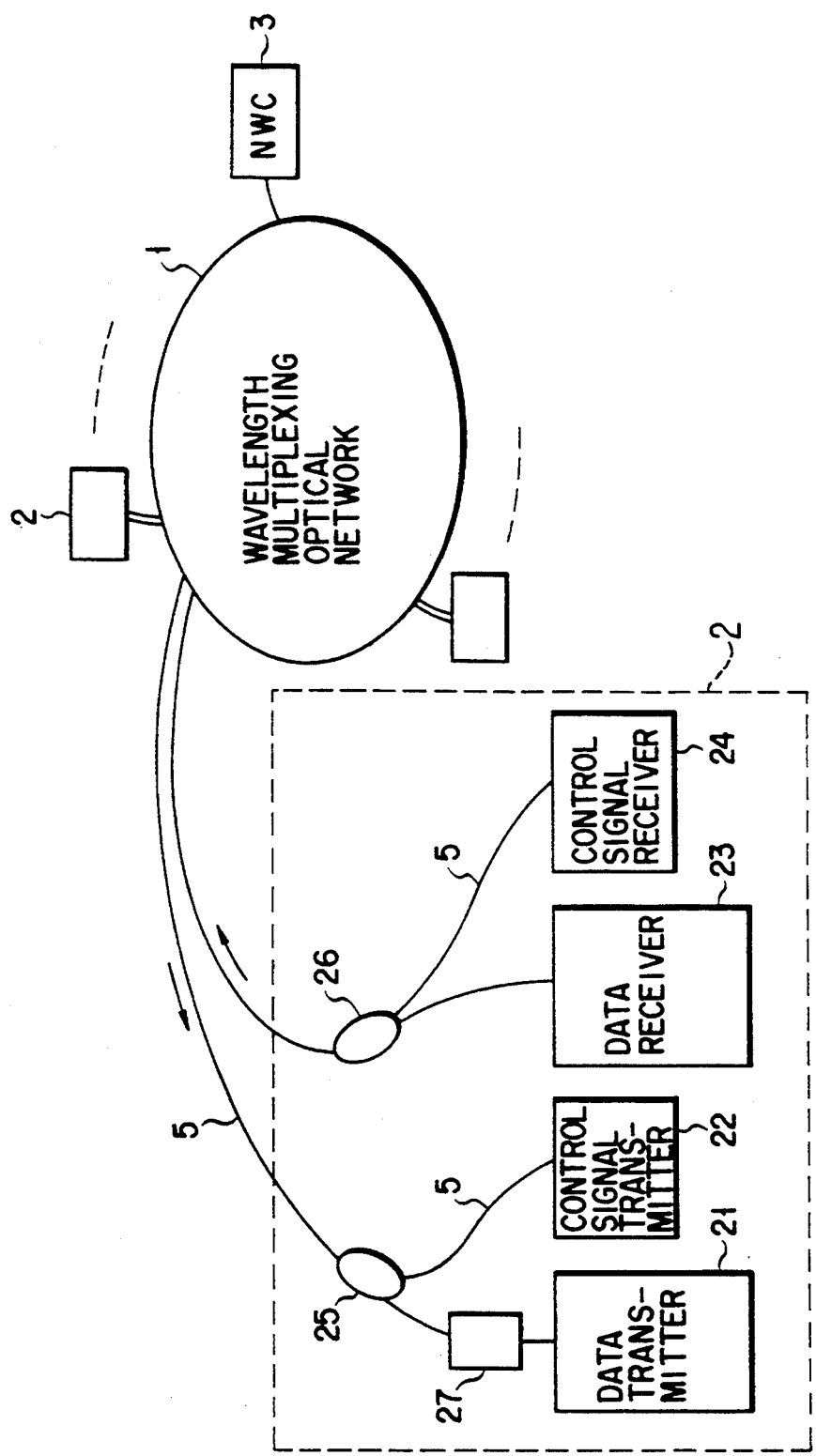
F I G. 5

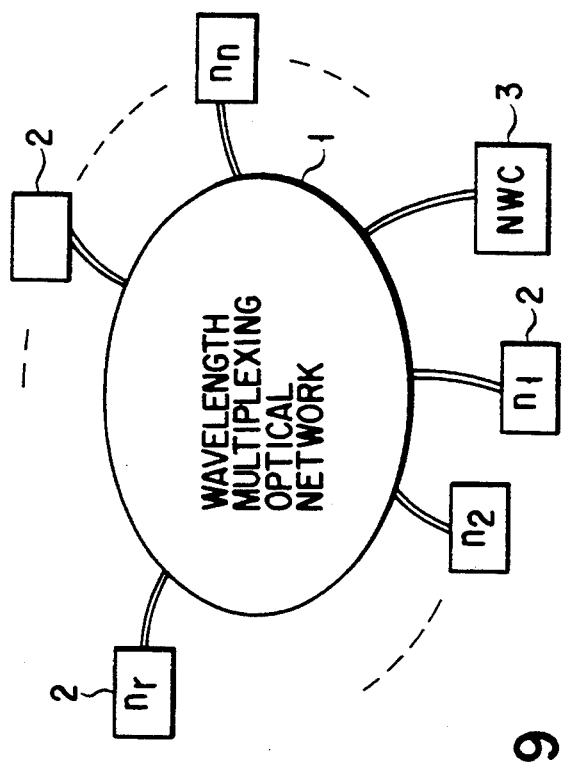
FIG. 9
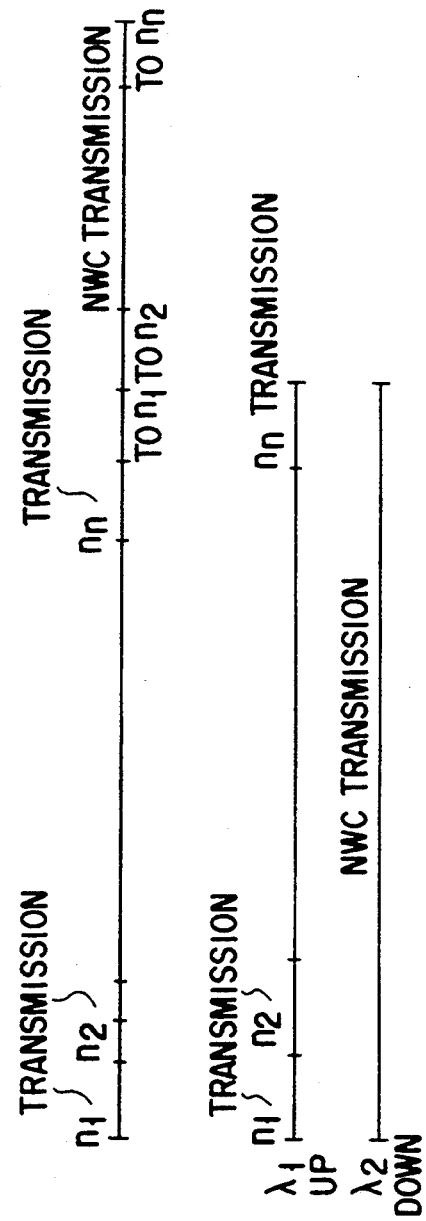

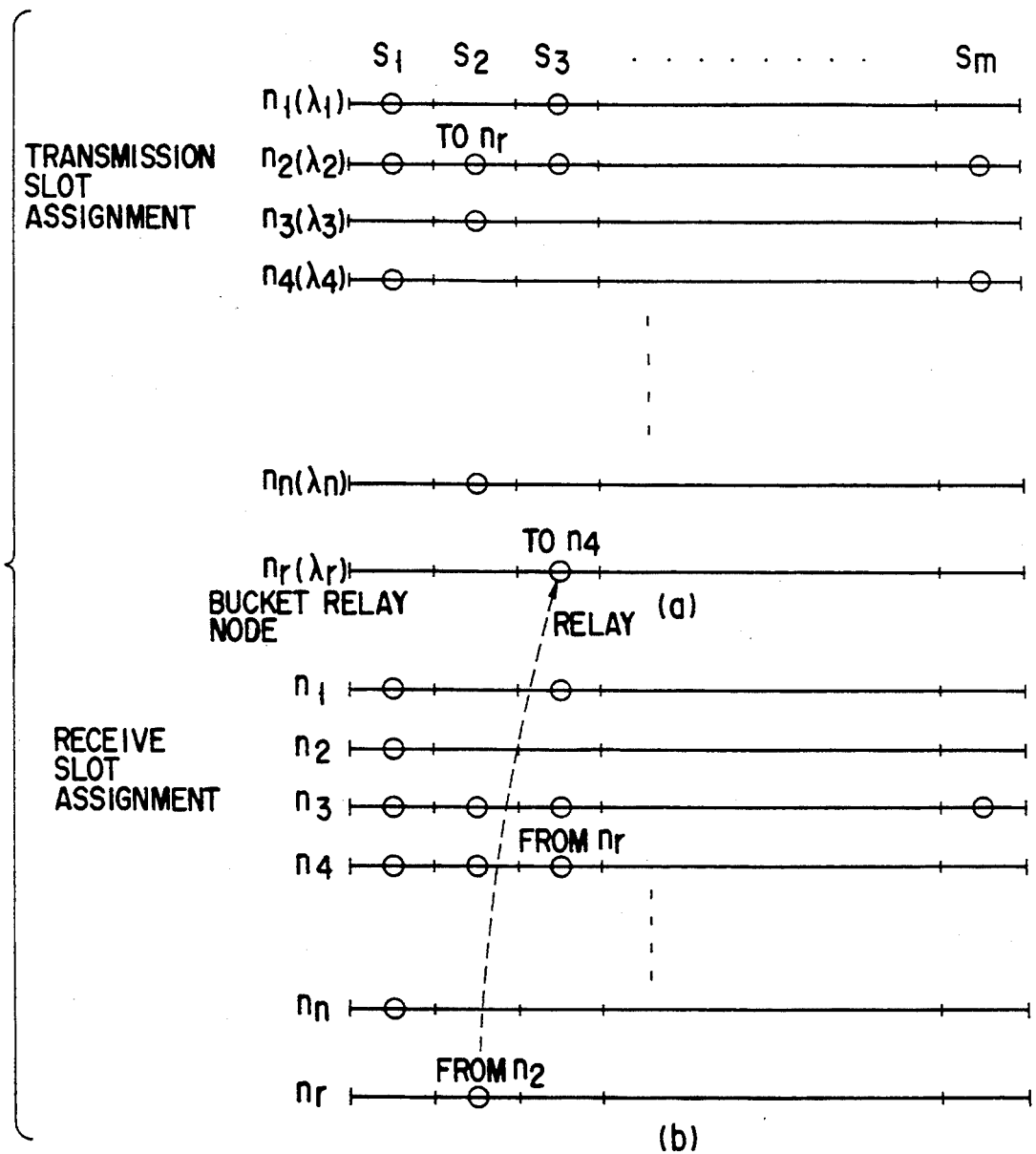
F I G. 10

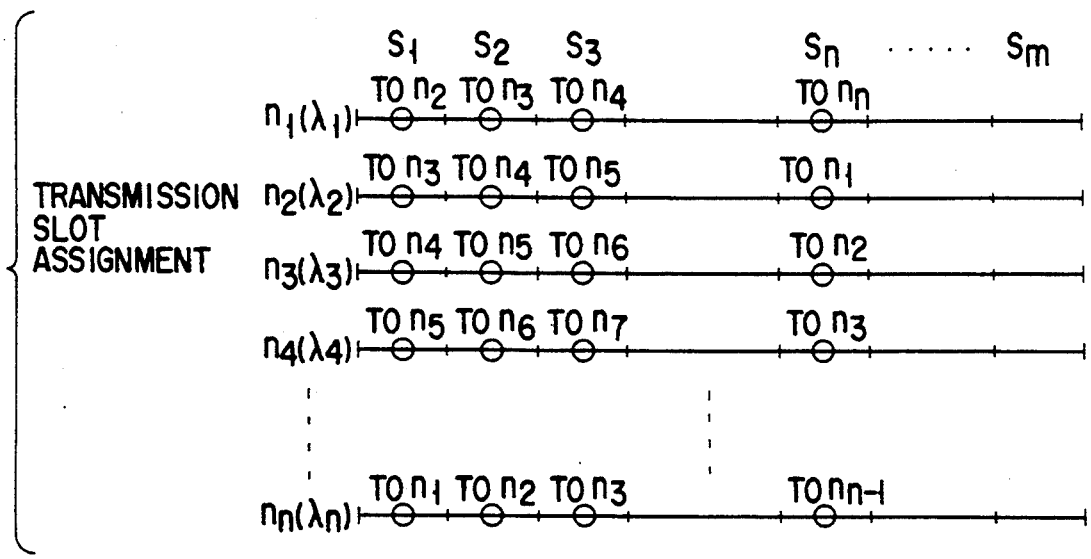
F I G. 12A
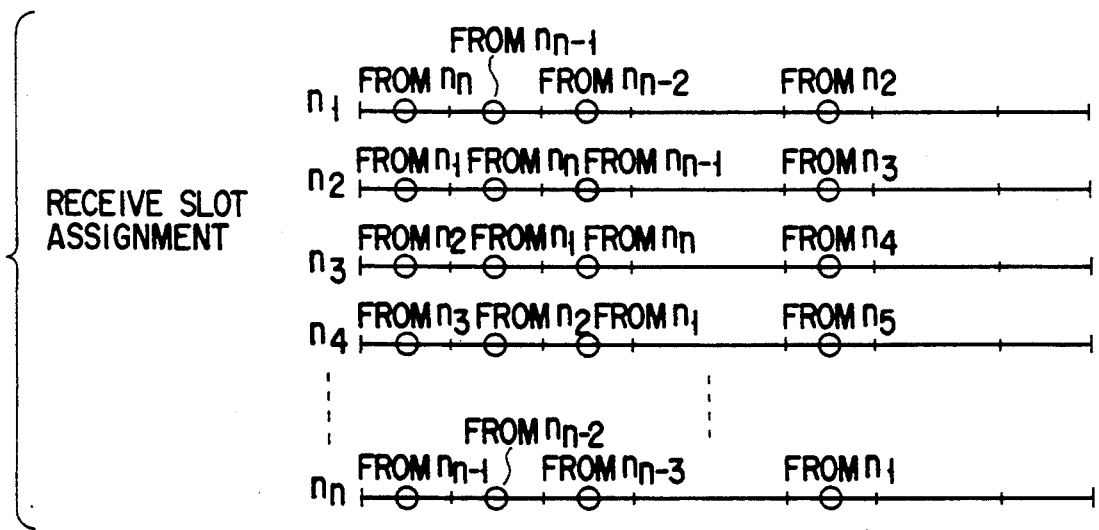
F I G. 12B

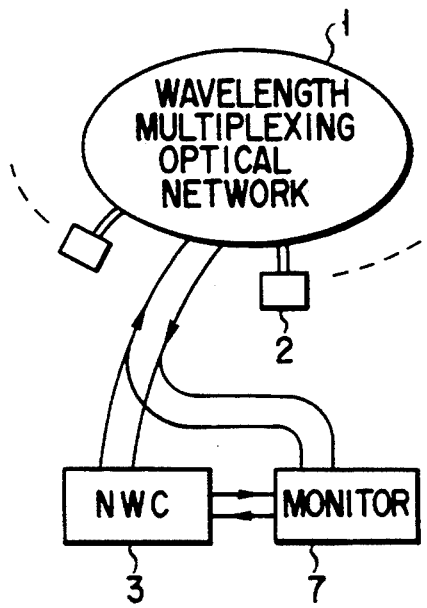
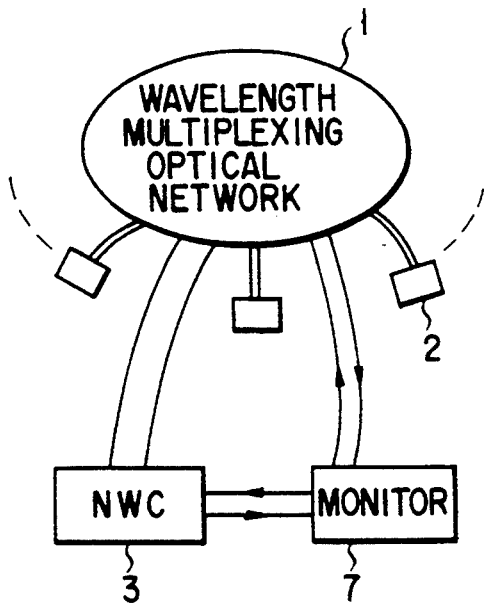
F I G. 14A  F I G. 14B
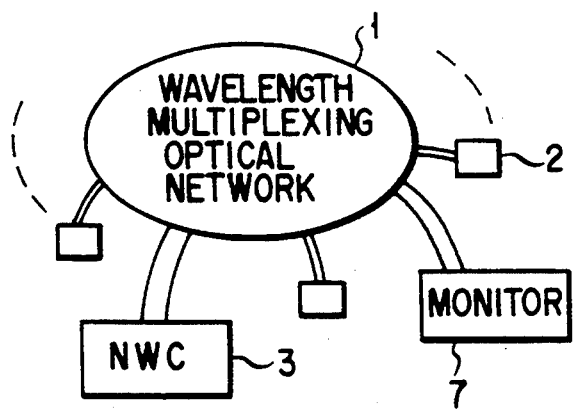
F I G. 14C

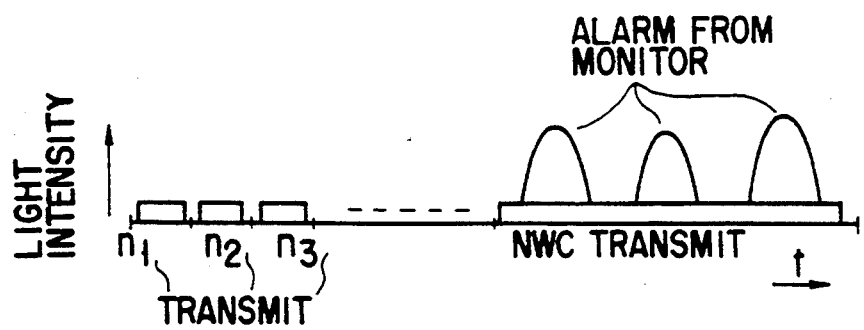
F I G. 15A
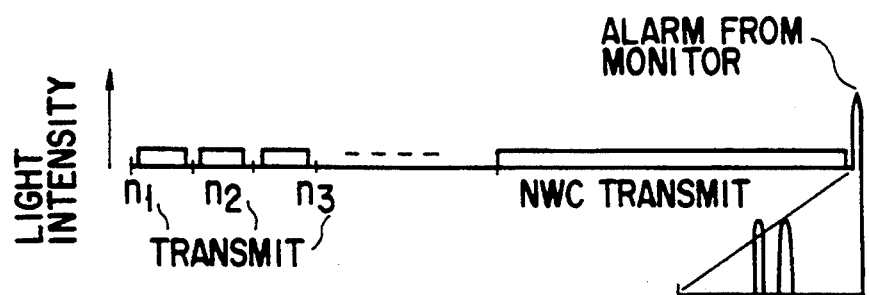
F I G. 15B
F I G. 15C
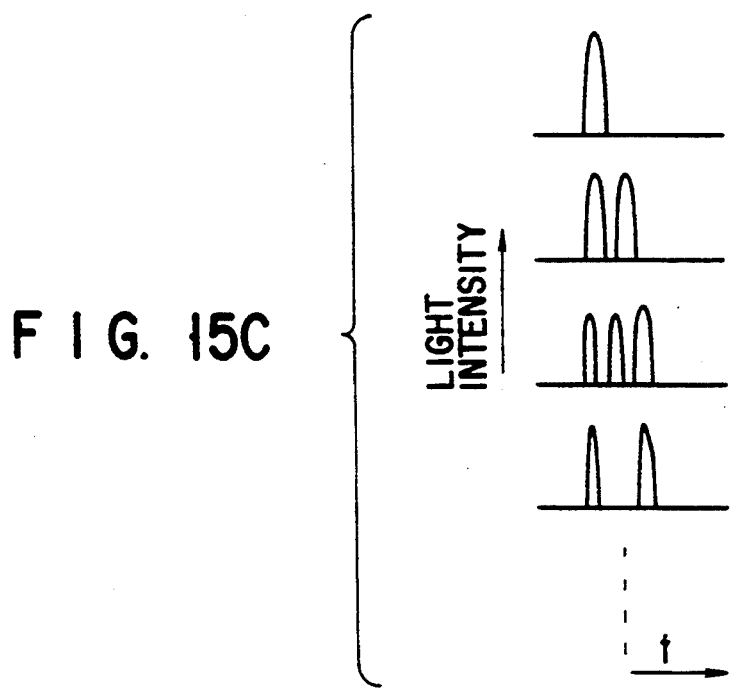

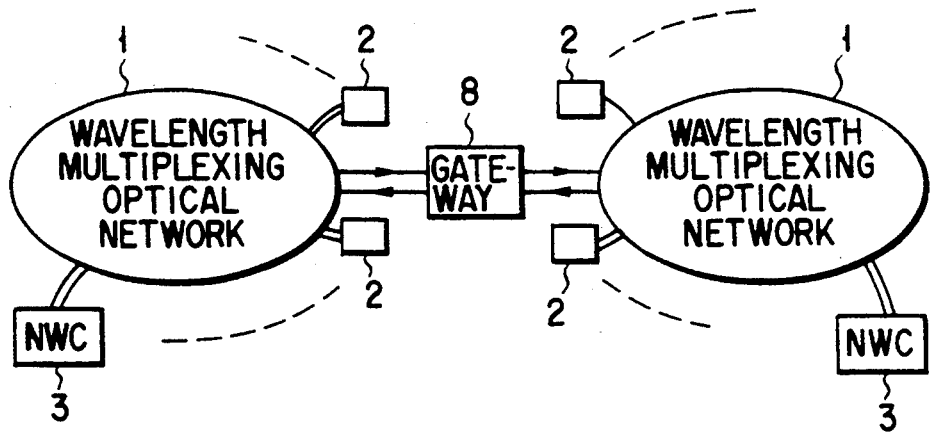
F I G. 16
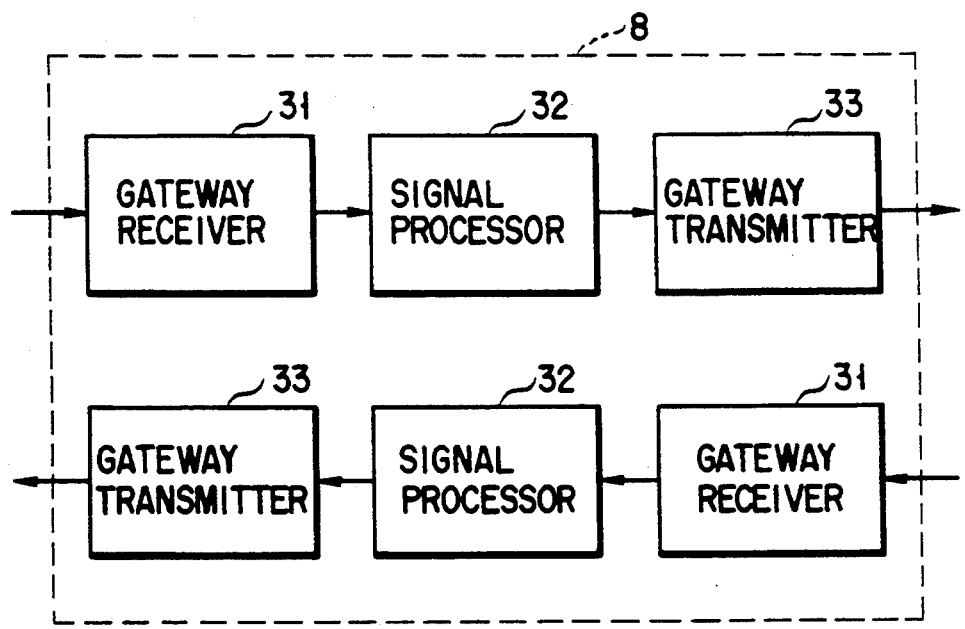
F I G. 17

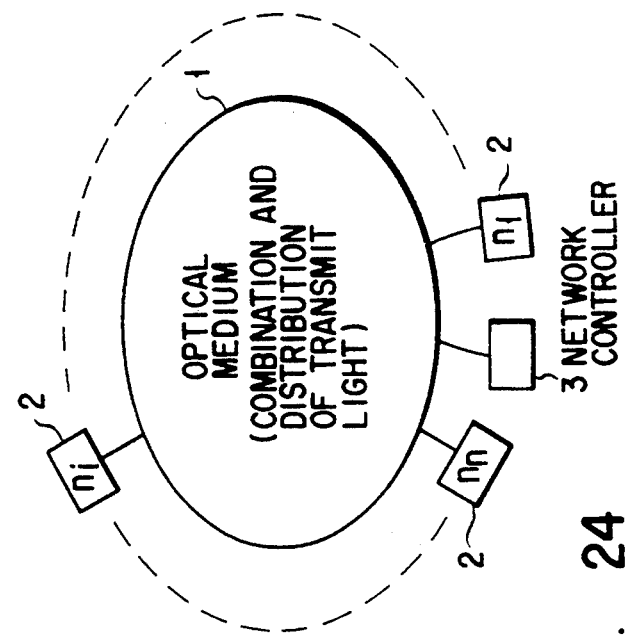
FIG. 24
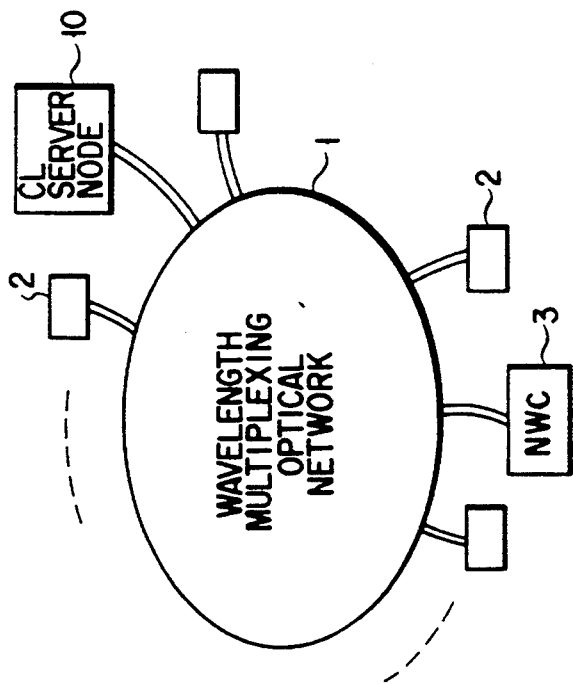
FIG. 22
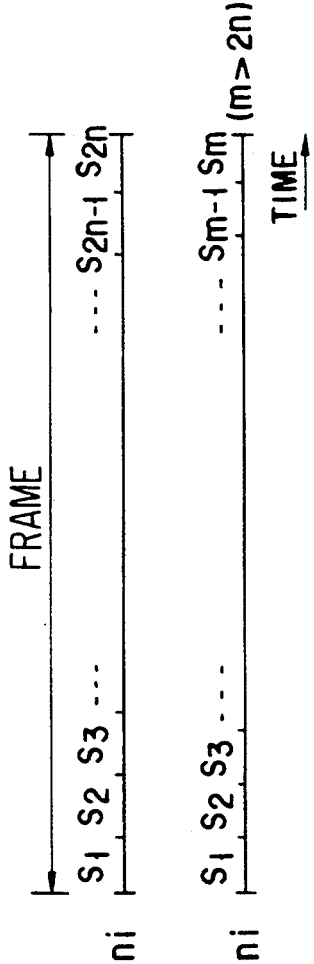
FIG. 23A
FIG. 23B

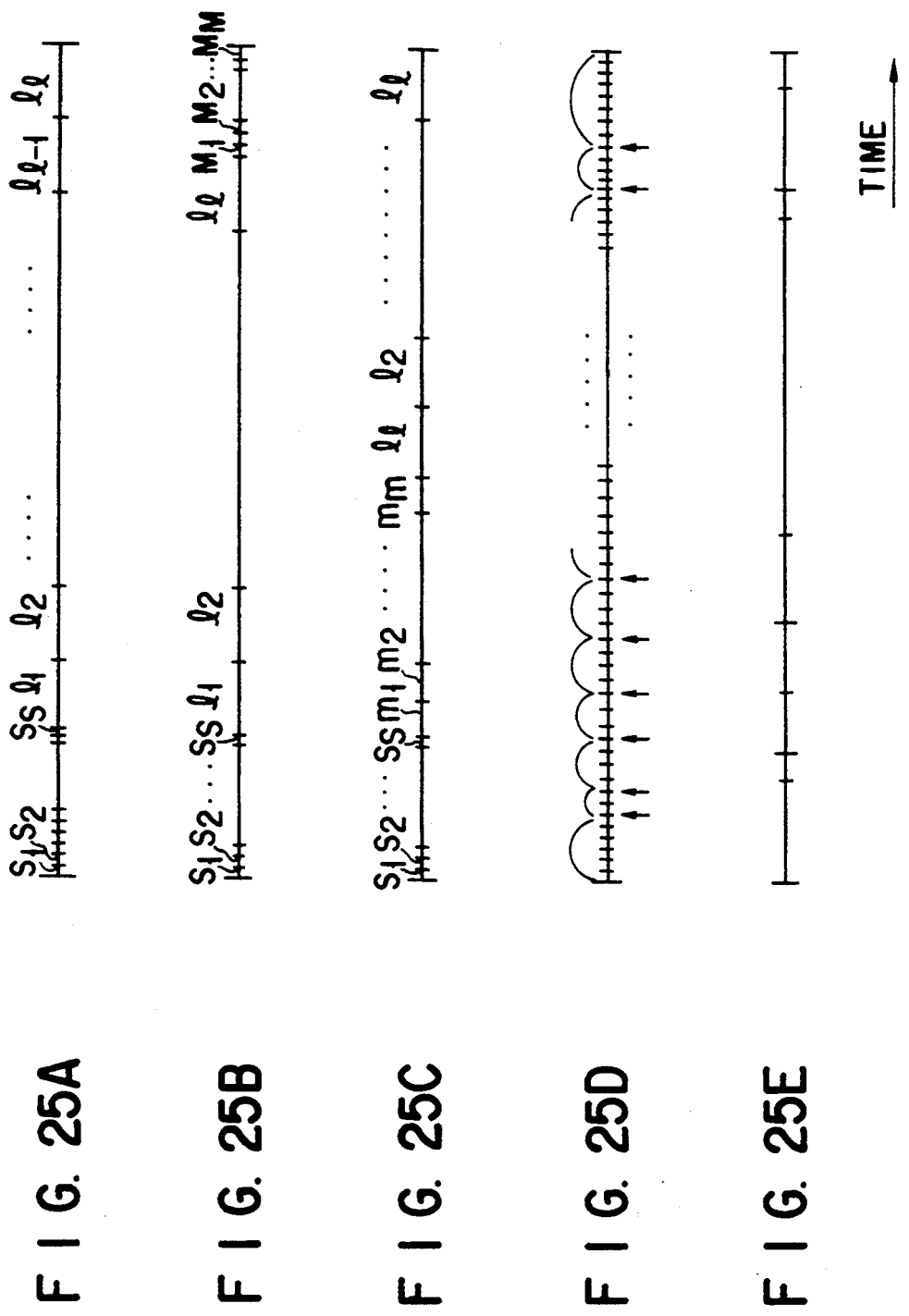

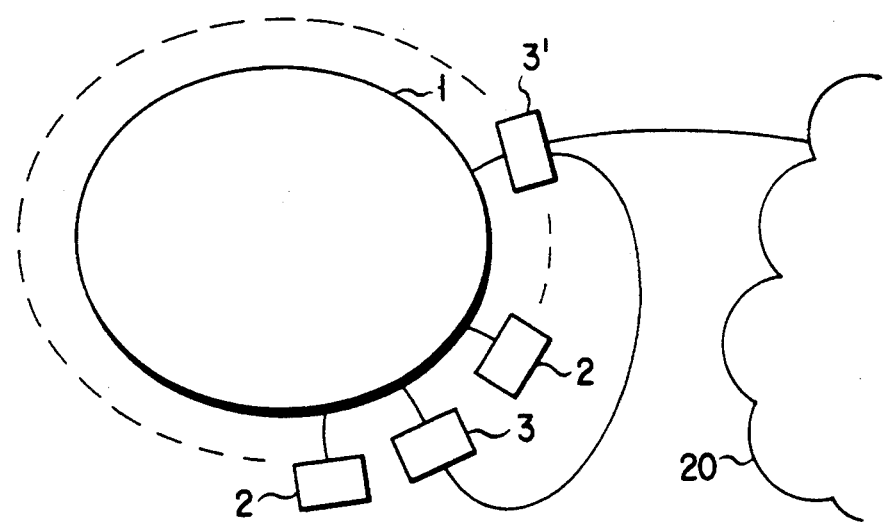
F I G. 28
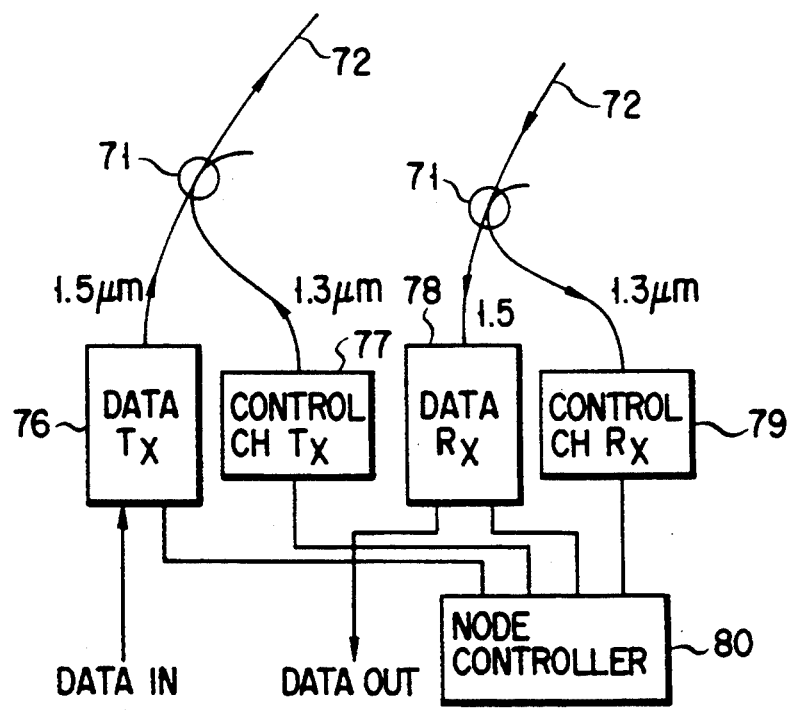
F I G. 29

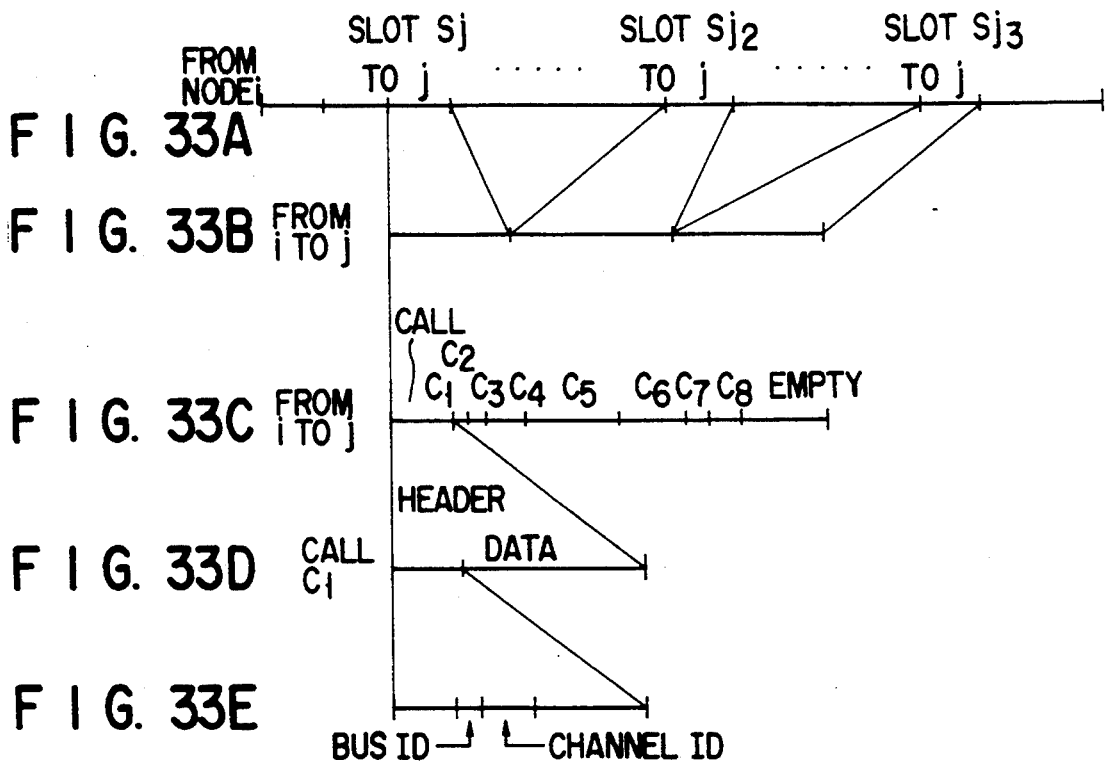
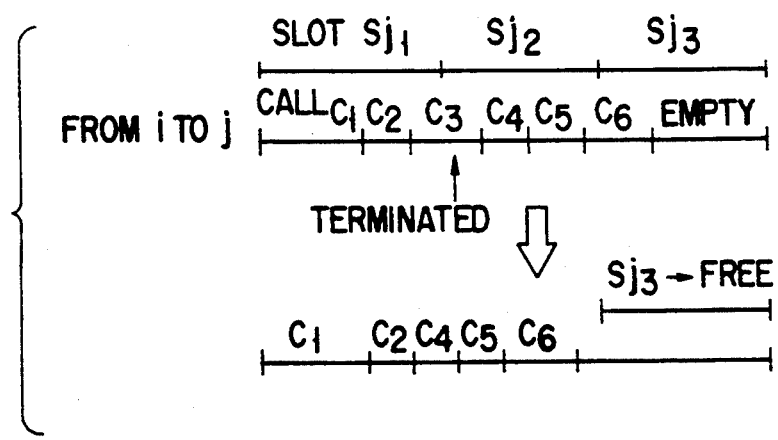
FIG. 34

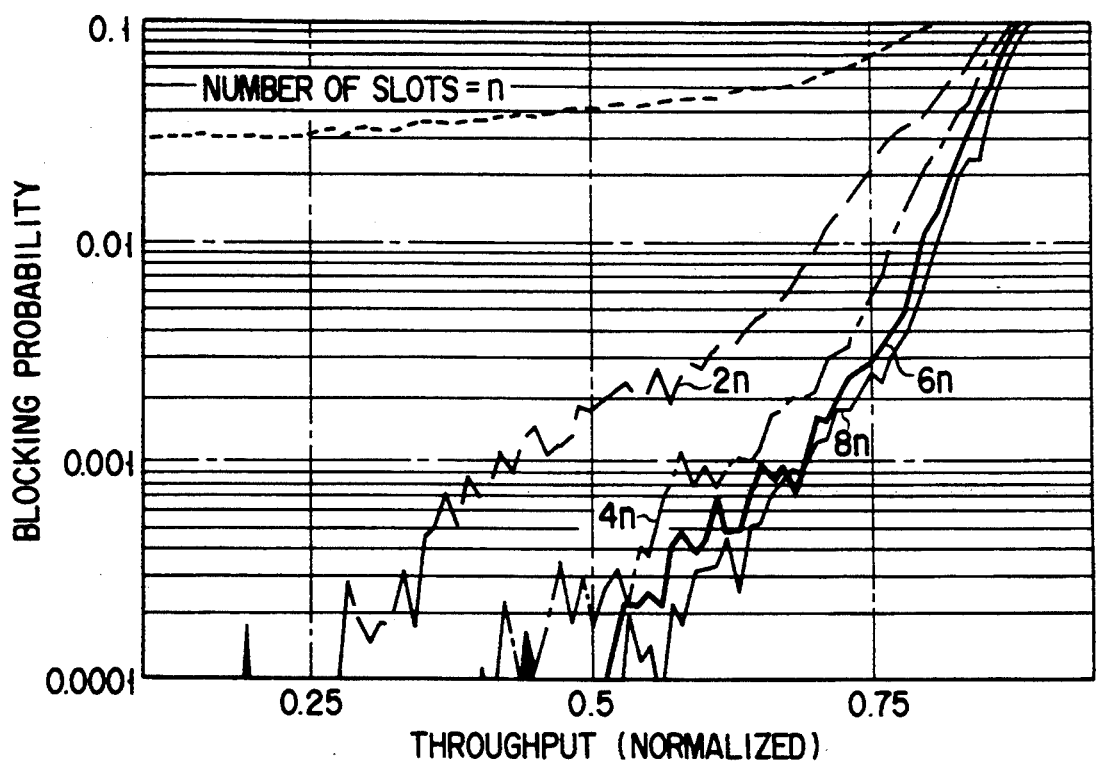
F I G. 38
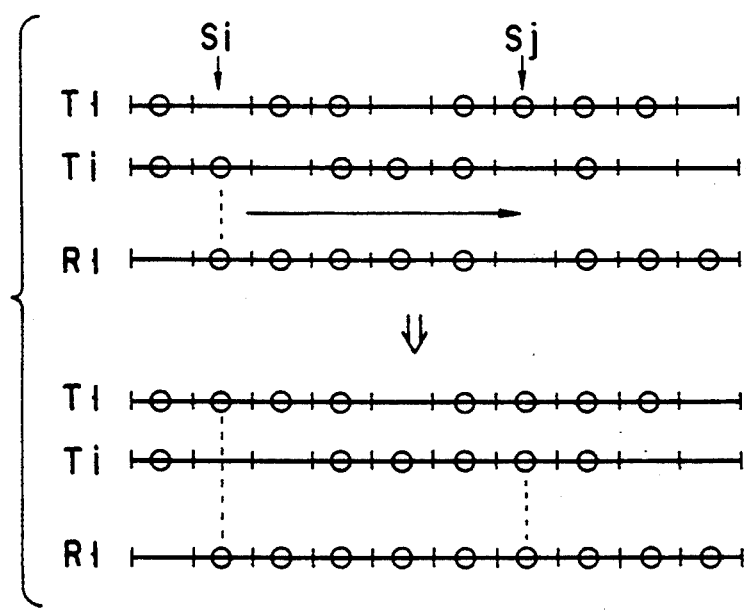
F I G. 40

COMMUNICATIONS SYSTEM

BACKGROUND OF THE INVENTION

1. Field of the Invention

The present invention relates to a communication system and, more particularly, to a communication system which uses a wavelength division multiplexing optical network.

2. Description of the Related Art

With the progress of information-intensive society, a backbone network that permits higher communication traffic is in increasing demand. As a method of implementing such a backbone network there is a wave length division multiplexing system in which light signals of different wavelengths individually modulated with data propagate through an optical fiber. So far, several methods of implementing a backbone network using wavelength division multiplexing have been proposed (for example, see Institute of Electronic Information and Communications Engineers Technical Report-Optical Communications System OCS92-77 to 82).

Of these methods, the method by Shimosaka et al. (OCS92-79) splits each wavelength into short duration time slots, a transmitter groups data into packets for each destination and sends them in an empty time slot. That is, this method uses both the wavelength division multiplexing and the time division multiplexing in combination. This method is effective for a system such as a backbone LAN (local area network), in which requests for transmission to many other stations are generated at almost the same time.

That system by Shimosaka et al. is a fixed receiving wavelength system, which sets a transmitting wave length of an optical transmitter of a source to a receiving wavelength of a destination. In this system, any amount of data can be transmitted as long as there is an empty time slot or slots for a reception node. If, therefore, node A uses all of empty time slots of node B, then node C located between node A and node B cannot send data to node B even though it desires to send. That is, node C has to wait for sending until node A finishes sending data to node B. This would result in a significant increase in the delay or discard rate. Also, a bandwidth for a connection oriented call cannot be guaranteed. In a backbone network for interconnecting LANs, requests for sending many nodes occur at almost the same time. Further, a number of connection oriented calls such as telephone, video, etc. are generated. Thus, such network as described above in which the network traffic is limited by particular nodes (in the above, node A) and the network bandwidth cannot be guaranteed is not suitable for backbone networks.

For a LAN, a broadcast function for sending the same data to all of nodes and a multicast function for sending the same data to an arbitrary number of nodes are important. Hereinafter, the broadcast and multicast are generically named "broadcast/multicast". To implement the broadcast/multicast functions by that system by Shimosaka et al, which is of a fixed receiving wavelength type, data need to be copied for subsequent transmission to all of reception nodes, which results in reduced efficiency.

Even if the receiving wavelength is made variable, if each node is equipped with a single data receiver, data receivers at reception nodes for broadcast/multicast must be ready to receive data at the timing of a transmission time in broadcast/multicast communications, that is, they must be placed in the state where they are receiving no data from other than a broadcasting/multicasting node. In other words, to permit broadcast/multicast communications when each node has a single data transmitter and receiver, there must be an empty time slot that is common to the data receivers. Up to now, however, how to implement such a state has not been considered. As described in, for example, Institute of Electronic Information And Communications Engineers Technical Research Report-Optical Communications System OCS92-84, that problem will be solved by equipping each node with multiple data transmitters and receivers. However, this approach will significantly increase the hardware cost and is not thus desirable in terms of implementation and cost-performance of a system.

As described above, problems with the optical communication system that uses conventional wavelength division multiplexing and time division multiplexing at the same time are that: (1) since the traffic is limited by part of nodes which transmit a large quantity of data, other nodes are not allowed to send data or the bandwidth of the call during transmitting is not guaranteed, and (2) even if an attempt is made to perform the broadcast/multicast facilities, an empty time slot common to all the reception nodes is not available, failing to perform broadcast/multicast communications.

SUMMARY OF THE INVENTION

It is an object of the present invention to provide an optical communication network which, using a network that uses a wavelength division multiplexing mode and a time division multiplexing mode in combination, permits high throughput communications with the guaranteed bandwidth of the connection oriented call and low cost and permits broadcast/multicast functions to be readily implemented.

The present invention, in a wavelength division multiplexed network in which a number of nodes perform communications using multiple wavelengths each of which is divided into time slots, provides a method of dividing each wavelength into a plurality of time slots in such a way as to provide of a connection-base architecture capable of attaining a lower cost and higher throughput and utilize effectively the bandwidth there of.

The present invention provides a method of performing clock distribution for synchronizing the data rate within the network without the provision of a clock-distribution-only transmitter and receiver.

The present invention provides a method of allocating path identifiers and channel identifiers in such a way as to alleviate the burden of network implementation imposed on a network controller.

The present invention also provides an optical communication system having a plurality of nodes inter connected by a wavelength multiplex optical network with a plurality of optical transmission channels of different wavelengths and node-to-node communications are performed using a plurality of time slots into which each optical transmission channel is divided, the system being equipped with a network controller that performs centralized control of time slot allocation to the nodes. A frame comprises a plurality of slots and the slots once allocated are used for all frames until its allocation is canceled or changed.

In the present invention it is desirable that control signals for notifying the network controller of a request for slot allocation from each node and notifying each node of time slot allocation thereto be transmitted over a control channel other than data channels for data transmission.

The present invention also provides a communication system which is further equipped with a failure detector for detecting a failure in the network controller and with a switching device which, when a failure in the network controller is detected, switches from the network-controller-based time slot allocation to a preassigned allocation scheme in which each node makes transmissions in time slots allocated thereto in advance or a distributed control scheme in which time slot allocation is made by transmitting and receiving nodes.

The present invention provides a communication system which have a function for arranging time slot allocation to transmission and reception nodes so that a receiving time slot common to all the nodes may be set up.

In order for the optical communication system of the present invention to perform connectionless-data communications, it is required only to connect to the optical wavelength multiplexing network a connectionless-data relay node which permits connectionless-data communications between nodes using residual bandwidth.

The present invention further provides an optical wavelength multiplexing network in which each of periodically successive frames is divided into a plurality of time slots, a plurality of nodes perform communications using a plurality of wavelengths, and moreover the number of time slots within one frame is twice or more that of nodes connected to the network.

In the same network, there may be provided two or more types of time slots of different duration within one frame.

In an optical wavelength multiplexing network in which each of wavelengths of light is divided into time slots which are used by nodes for data transmission and reception as instructed by a network controller, and a control channel is provided for controlling the network, the network controller is connected to a public network or equipment having clocks synchronized with the public network and distributes clocks over the control channel to the nodes connected to the network.

In an optical communication network in which each of wavelengths of light is divided into time slots which are used by nodes for data transmission and reception as instructed by a network controller, path identifiers are allocated by the network controller and channel identifiers are allocated by respective individual nodes, the path identifier allocation and the time slot allocation being independent.

In communication systems of the present invention configured as described above, the network controller performs centralized control for time-sharing the optical transmission channel of each wavelength and for determining how each node uses each time slot obtained by time-sharing the frame. If the time slot allocation rules loaded in the network controller are suitable, unfairness that other nodes are made unable to transmit because of a specific node that transmits a large amount of data as before will not occur.

If, in this case, a request for transmission by each node on the network controller and notification of time slot allocation by the network to each node are performed over the control channel, data transmission will not be interrupted by the transmission of control signals over the control channel.

When the time slot allocation is thus centrally controlled by the network controller, there arises the possibility that a failure in the network controller may cause the whole communication system to go down. To circumvent such a situation, the present invention proposes switching from the network-controller-based time slot allocation to a preassigned allocation scheme or a distributed control scheme upon detecting a failure in the network controller and its backup (dual network controller).

Data transmission from a node to another is generally performed in the form that uses a time slot at regular intervals of the frame duration. Not only a time slot currently in use but also time slots in the following frames are reserved for subsequent transmission. For the broadcast/multicast purpose, therefore, it is required to shift the position of a time slot reserved for subsequent use in the following frame so that a common receiving time slot is made available to all of receivers. However, it, in order to set up a common receiving empty time slot, shifting of the time slot is started after a request for broadcast/multicast has occurred, it will take long to set up a call. In a system configuration which combines a time division multiplexing mode with a wavelength division multiplexing mode, all of time slots are scarcely used simultaneously. Some of time slots may be empty most of time.

In view of this fact, the present invention arranges time slot allocation by the network controller so that an empty receiving time slot can be reserved which is common to all of nodes. This permits a request for broadcast/multicast immediately.

If connectionless data is transmitted over a relay node, it is not required to request the network controller to transmit that data. And moreover the band width used for transmission of other normal data will not be disturbed.

To explain the operation of the present invention, such an optical wavelength multiplexing network as shown in FIG. 24 will be considered. Transmitted light beams from nodes are mixed or switched in a light medium within a network and distributed to receivers in reception nodes. As shown in FIG. 37, each node selectively receives a transmitted light beam in a respective time slot. This allocation is repeated for each frame as far as the slot reservation is not changed or canceled. In this case, assuming the number of nodes within the network to be n as shown in FIG. 24, the network efficiency varies with the rate of the number of time slots within a frame (a period of reception) relative to the number n of nodes. When a node sends an equal traffic volume to all other nodes or when the traffic is not almost changed from the installation of a network, the way of dividing the bandwidth may be fixed at the time of installation of the network. In practice, however, the traffic varies with time. In such a case, it should be required that only one time slot for each of source and destination node be reserved in a node, and in addition time slots for absorbing variations in traffic or spare time slots be provided. If, therefore, the number of time slots in a frame is less than the number of nodes within the network, there arises the possibility that new requests for transmission cannot be serviced sufficiently. Computer simulations was made as to whether a new transmission request generated by a node can be serviced or not. As an example, such results as shown in FIG. 38 were obtained. In this figure, the abscissa indicates normalized throughput within a network, while the ordinate indicates the probability that transmission requests generated at each throughput cannot be accepted or they are blocked, that is, blocking probability. The number n indicates the total number of nodes. It will be understood that there is a great difference between the case where the time slots are equal in number to the nodes and the case where there are twice as many time slots as nodes. If, therefore, there are twice or more as many time slots as there are nodes, it will become possible to prevent calls from suffering heavy blocking.

Since the volume of traffic which a node transmits varies among destination nodes, there may also be a destination node that requires only a small percentage of the duration of a time slot to send data. As described above, the more the time slots increase, the lower the loss probability becomes. However, in a net work of the present invention in which switching from a receiving wavelength to another receiving wavelength is made between time slots, a guard time is needed at switching time. Thus, if each time slot is too short in duration, then the guard time will occupy a large proportion of the entire time, reducing efficiency. For this reason, the number of time slots should be selected in such a way as to prevent efficiency reduction and considerable call blocking.

When the time slots cannot be made too small in terms of efficiency and they are all of equal size, one time slot will be occupied even for a reception node with a very small traffic. This is uneconomical when traffic unbalance is intense. It is therefore preferable that time slots be prepared in at least two sizes: small and large. Thereby, it is permitted to make a selection between large and small time slots, improving throughput.

If the clock rate is not unified within a network, a subtle difference in clock rate will result in a lack or surplus of bits for real-time communications (phone calls, etc.) from a terminal connected to a node to a terminal connected to another node within the network. For this reason, the clock rate within the network should be unified. Likewise, the clock rate must be uniform in the case where a connection is made from within the network to an external public network as well. For this reason, clocks synchronized with a public network are normally used in networks. A question thus arises as to how the clock rate is unified.

Directly connected to a public network, each node will be able to acquire clocks synchronized with the public network. However, all of nodes are not always connected to the public network. A backbone network like the present invention often configures itself to serve as a gateway for connection to a public network. Unless clocks are supplied via the network, clocks synchronized with the public network may not be supplied to nodes that are not connected to the public network.

On the other hand, methods of supplying clocks acquired by a node connected to the public network to other nodes includes a method of providing a clock-only channel or a method of extracting clocks from a signal transmitted from a node connected to the public net work.

The former method requires clock-only transmitters and receivers, increasing cost. Therefore, the latter method is normally adopted. In the network of the present invention, each node receives data from different nodes at different time slots. Thus, a node that is not connected to the public network has to keep the clock rate unchanged from the time it receives signals from a clock-supply node in a time slot until it receives from that node in the corresponding time slot in the succeeding frame. Although depending on the frame length, it is very difficult to implement.

In the invention described above, there are provided a network controller for time slot allocation within a network and a control channel for notification of time slot allocation. In this case, the network controller makes transmissions frequently and thus occupies a large percentage of the time used for transmission over the control channel. The transmissions made by the network controller is always received by every node. If, therefore, the transmission rate in the control channel is set to fit the hierarchy of a public network, and the network controller is connected to the public network to obtain clocks therefrom and makes transmissions over the control channel at the clock rate fitting to the public network, each node is allowed to extract clocks synchronized with the public network from the transmissions of the network controller. Since, as described above, the network controller makes transmissions frequently over the control channel, clocks can be kept.

The network provides identifiers to calls so as to distinguish among them. These identifiers normally include path identifiers for distinguishing among paths that are large segments and channel identifiers for distinguishing calls within each path. With a network like the present invention, it is straightforward to make time slots correspond to or link them with paths.

In the network of the present invention, when transmission to the same node spans a plurality of time slots, if a variation occurs in traffic and consequently fewer time slots are sufficient, possible time slots should be released. If time slots are linked with paths, identifiers must be reissued when the time slots are decreased in number because of a variation in traffic. So, by making physical time slots and virtual paths independent completely, the need for altering pass identifier allocation is eliminated. Moreover, the channel identifiers do not have to be altered as well.

Such issue of identifiers is performed by a switching unit in a normal switched network. In the present invention, it is performed by the network controller. But, the network controller must do time slot allocation as its main work. The addition of the issue of identifiers will increase the burden imposed on the network controller. The path identifiers must be centrally managed for one network. Thus, the net work controller manages path identifier. Unless the same path identifier is allocated to different source-destination pairs, the channel usage within that path can be left to a pair using that path. Therefore, by leaving the issue of channel identifiers to each node, the burden imposed on the network controller can be alleviated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B are schematic representations of optical communication systems according to a first embodiment of the present invention;

FIG. 5 is a block diagram of a general node of FIG. 1A;

FIG. 9 is a schematic representation of an optical communication system equipped with a relay node in accordance with a second embodiment of the present invention;

FIG. 10 is a timing diagram for use in explanation of the transmitting and receiving time slot allocation control in the second embodiment;

FIGS. 11A and 11B are timing diagrams for use in explanation of transmitting and receiving operations of a control signal on a control channel in a third embodiment of the present invention;

FIGS. 12A and 12B are timing diagrams of time slot allocation in a preassigned allocation scheme in a fourth embodiment of the present invention;

FIGS. 14A, 14B and 14C are schematic representations of optical communication systems equipped with a monitoring device in accordance with a sixth embodiment of the present invention;

FIGS. 15A, 15B and 15C illustrate examples of alarm signals produced by the monitoring devices of FIGS. 14A to 14C;

FIG. 16 is a schematic representation of an optical communication system in which two or more networks are interconnected in accordance with a seventh embodiment of the present invention;

FIG. 17 is a block diagram of the gateway of FIG. 16;

FIG. 22 is a schematic representation of an optical communication system having a connectionless data server node in accordance with a ninth embodiment of the present invention;

FIGS. 23A and 23B illustrate examples of time slot division in which the number of time slots within one frame are 2 n or more for the number n of nodes in an optical communication network according to a tenth embodiment of the present invention;

FIG. 24 shows a configuration of a communication network according to an eleventh embodiment of the present invention;

FIGS. 25A to 25E show various time slots in a communication network according to a twelfth embodiment of the present invention;

FIG. 28 shows a communication network in which a network controller acquires clocks from a node of a gateway to a public network in accordance with a fifteenth embodiment of the present invention;

FIG. 29 illustrates a part of a communication network in which a node has a control channel wavelength-multiplexed in accordance with a sixteenth embodiment of the present invention;

FIGS. 33A to 33E are diagrams for use in explanation of a method of allocating identifiers in a communication network according to a twentieth embodiment of the present invention;

FIG. 34 is a diagram for use in explanation of a manner in which a time slot is released regardless of identifiers in a communication network according to a twenty-first embodiment of the present invention;

FIG. 38 is a graph illustrating the blocking probability in a network of the present invention with the number of time slots taken as a parameter;

FIG. 40 is a diagram for use in explanation of an example of a procedure of arranging and shifting time slots associated with FIG. 39.

DETAILED DESCRIPTION OF THE PREFERRED EMBODIMENTS

Figure 2A:
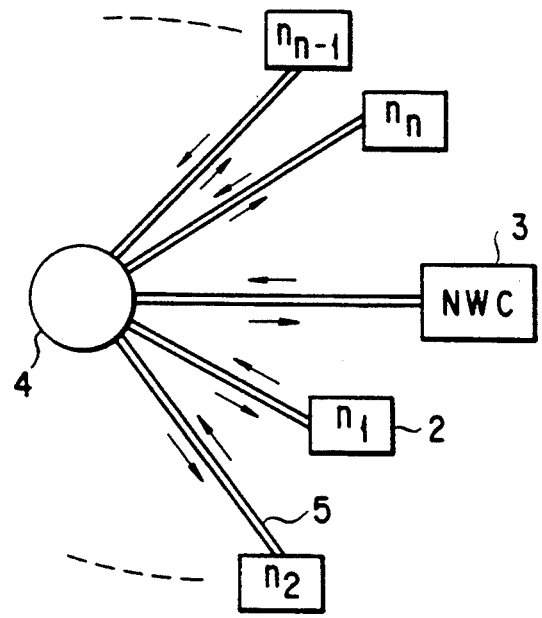
FIGS. 2A and 2B illustrate a passive star network and a ring network used in a wavelength multiplexing optical network of the present invention.
Figure 2B:
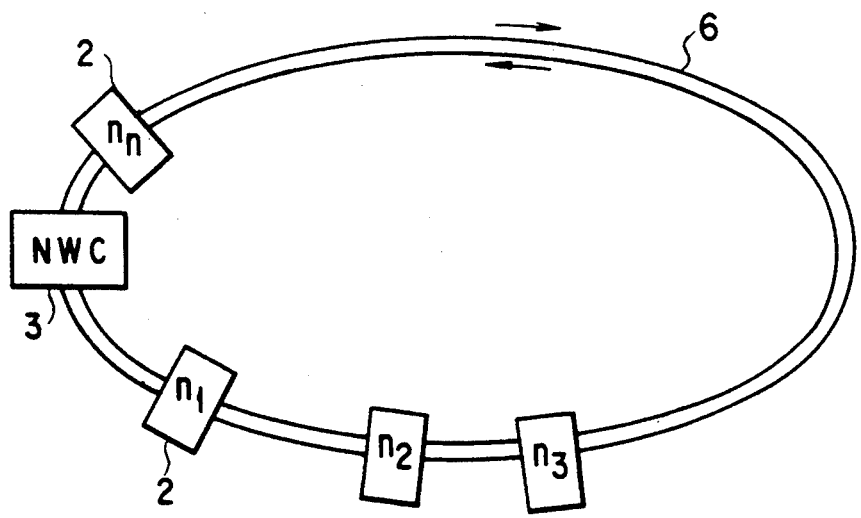
Figure 3:
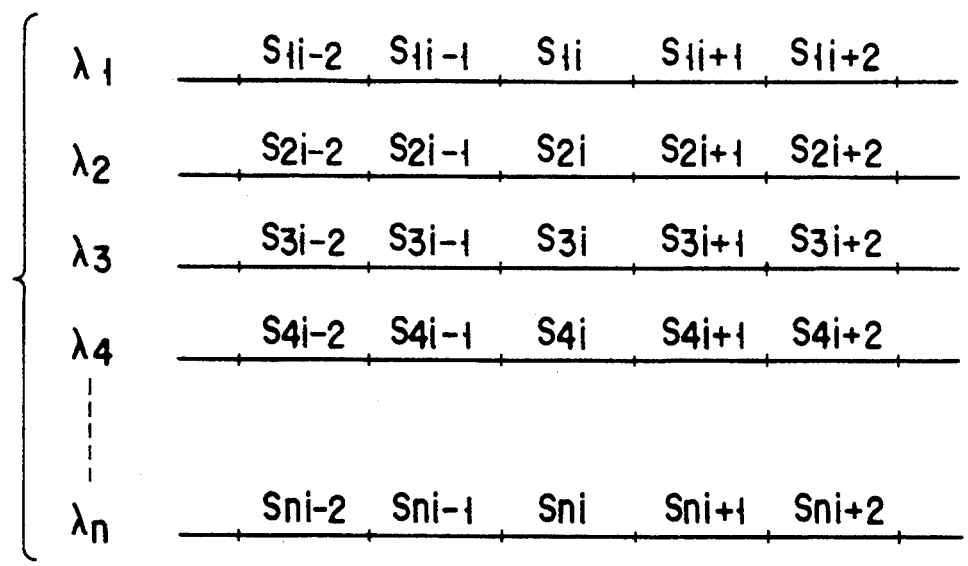
FIG. 3 is a diagram for use in explanation of time division of each wavelength used in the wavelength multiplexing optical network into multiple time slots.

Referring now to FIGS. 1A and 1B there is illustrated an optical communication system according to an embodiment of the present invention. In FIG. 1A, to a wavelength multiplexing optical network 1 are coupled general nodes (n1-nn) 2 for communicating with other nodes, and a network controller (NWC) 3. The wave length multiplexing network 1 can be constructed from, for example, a passive star network comprised of a star coupler 4 and optical fibers 5 as shown in FIG. 2A, a ring network using a ring fiber 6 as shown in FIG. 2B, or any other type of network. The network controller 3 may be a dedicated node as shown in FIG. 1A. Alternatively, as shown in FIG. 1B, the network controller 3 may be used as a general node as well.

When a node transmits data to another node, the network controller 3 decides which of a number of time slots Sij, into which time is divided on each of optical transmission channels of wavelengths λ1 to λn, is to be used for the data transmission.

Figure 4:
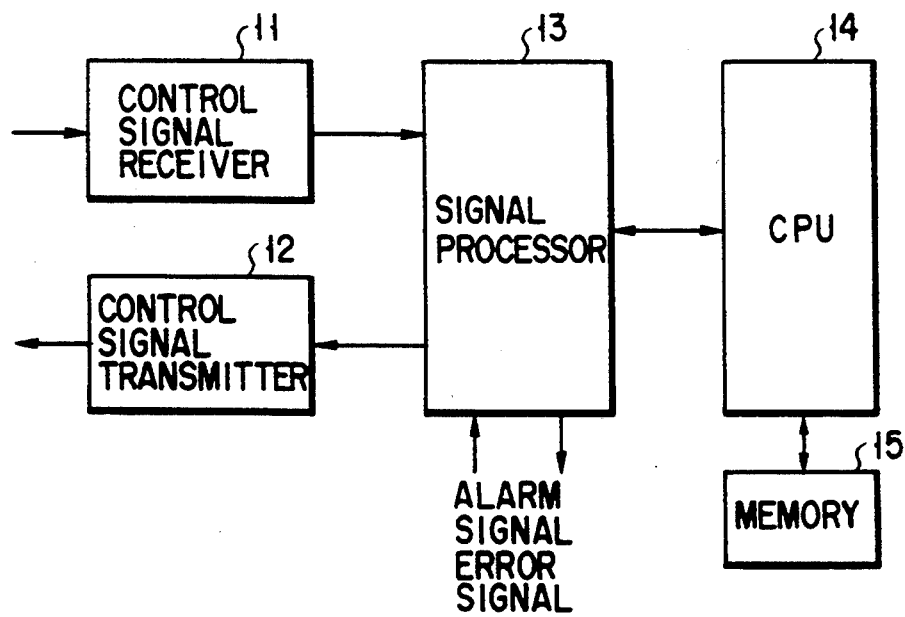
FIG. 4 is a block diagram of the network controller of FIG. 1A.

FIG. 4 is a block diagram of the network controller 3, which is constructed mainly from a control signal receiver 11, a control signal transmitter 12, a signal processor 13, a central processing unit (CPU) 14, and a memory (RAM: random access memory) 15. The control signal receiver 11 receives from each node 2 control signals including a signal to notify the controller of the generation of a request to send. The control signal transmitter 12 sends to each node 2 control signals including a signal to notify it of the time slot allocation.

The signal processor 13 mainly performs a process of assorting control signals received by the control signal receiver 11 and converting the control signals into data in the form that the CPU 14 can handle and a process of converting data on time slot allocation from the CPU 14 into a signal in the form suitable for transmission by the control signal transmitter 12. Also, the signal processor 13 accepts an alarm signal or error signal to be described later and transfers it to a display unit (not shown) to notify an operator of it.

The memory 15 stores a table indicating time slot allocation of nodes 2. Upon reception of received data by the control signal receiver 11 from the signal processor 13, the CPU 14 refers to the memory 15 and determine allocation of a time slot and sends information indicating the determined time slot via the signal processor 13 to the control signal transmitter 12. The control signal transmitter 12 transmits to a node that generated a request to send a control signal for in forming it of the time slot allocation thereto.

The transmission of a control signal of a request to set a time slot from each node 2 to the network controller 3 and the transmission of a control signal from the network controller 3 to each node 2 which notifies that node of time slot allocation are made via a control channel that is separate from a data channel used for data transmission. Thus, the use of the control channel to transmit control signals will not prevent the transmission of data. As the control channel there is available an optical transmission channel of a specific wavelength of a plurality of wavelengths used for wavelength division multiplexing. Alternatively, an optical transmission cable or an electrical transmission cable may be prepared for the control channel only. When a control signal contains little information, a specific time slot on transmission channels which are originally used for data transmission may be used as the control channel.

FIG. 5 shows an arrangement of a general node 2 of FIG. 1, which includes a data transmitter 21, a control signal transmitter 22, a data receiver 23, a control signal receiver 24, a WDM coupler 25, a WDM divider 26, and an optical switch 27. Each of the data transmitter 21 and the data receiver 23 transmits or receives data via wavelength division multiplexed channels, for example, the 1.5 μm band. And each of control transmitter 22 and receiver 24 transmits or receives control signals via control channels of, for example, the 1.3 μm band. The WDM coupler 25 and the WDM divider 26 respectively mixes and separates the data and control channels so as to transmit data and control signals via the same optical fiber 5. The optical switch 27 is necessary or unnecessary, as the case may be, which will be described later in detail. Though not shown, each node has a controller which controls the transmitters 21, 22 and the receivers 23, 24. The data transmitter 21 and receiver 23 have an incoming line and an outgoing line of data from the lower networks, respectively.

Figure 6:
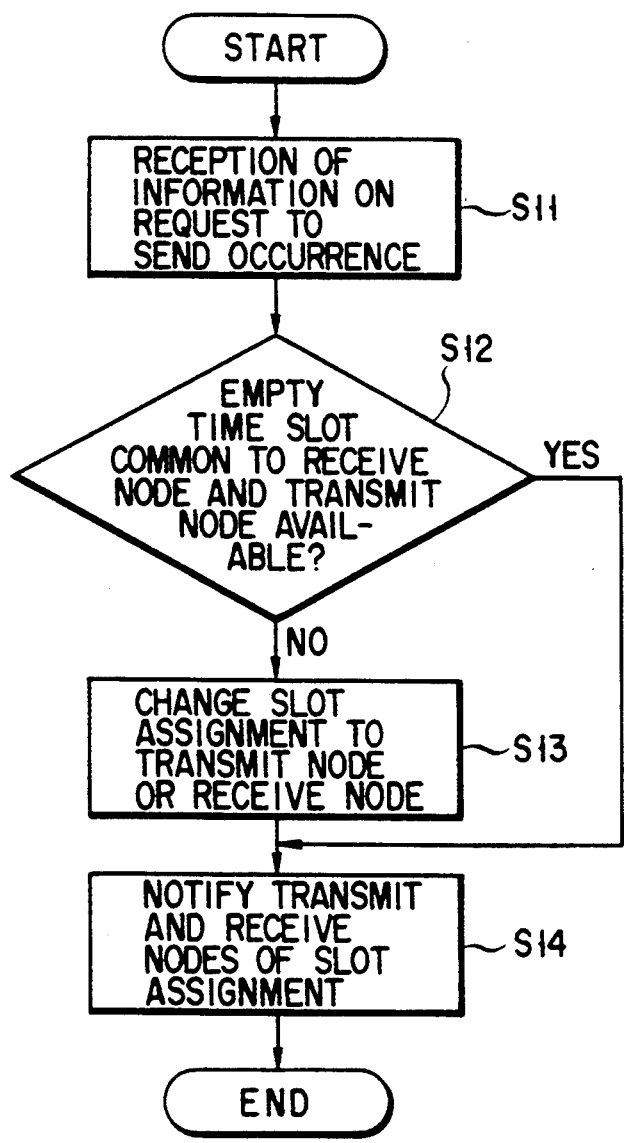
FIG. 6 is a flowchart for the outline of the time slot allocation control by the network controller of FIG. 1.

Next, a reference will be made to a flowchart of FIG. 6 to give the outline of the time slot allocation control by the network controller 3 according to the present embodiment.

First, when a general node (transmission node) is going to transmit data to another general node, the control signal transmitter 22 in that transmission node transmits to the network controller a control signal which notifies the controller of a request for slot allocation. The control signal is received by the control signal receiver 11 in the controller (step S11) and then entered via the signal processor 13 into the CPU 14, which refers to the memory 15 to determine whether an empty time slot common to the transmission and reception nodes (hereinafter referred to as a common empty time slot) exists (step S12). If a common empty time slot exists, then the CPU 14 issues to the control signal transmitter 12 via the signal processor 13 information indicating that the common empty time slot has been allocated for the data transmission between the transmission and reception nodes. The control signal transmitter 12 then transmits to the transmission and reception nodes a control signal for notifying them that the common empty time slot has been allocated for data transmission (step S14). If, on the other hand, there is no common empty time slot, then the time slot allocation to the transmission node or the reception node is changed (step S13), and the procedure goes next to step S14. If the time slot allocation is impossible in steps S12 and S13, then the transmission node is notified that the slot allocation ended in failure. Upon reception of the control signal including time slot allocation notification from the network controller 3 by the control signal receiver 24, the transmission and reception nodes transmit and receive data in that allocated time slot allocated by the use of their data transmitters 21 and data receivers 23.

Figure 7A:
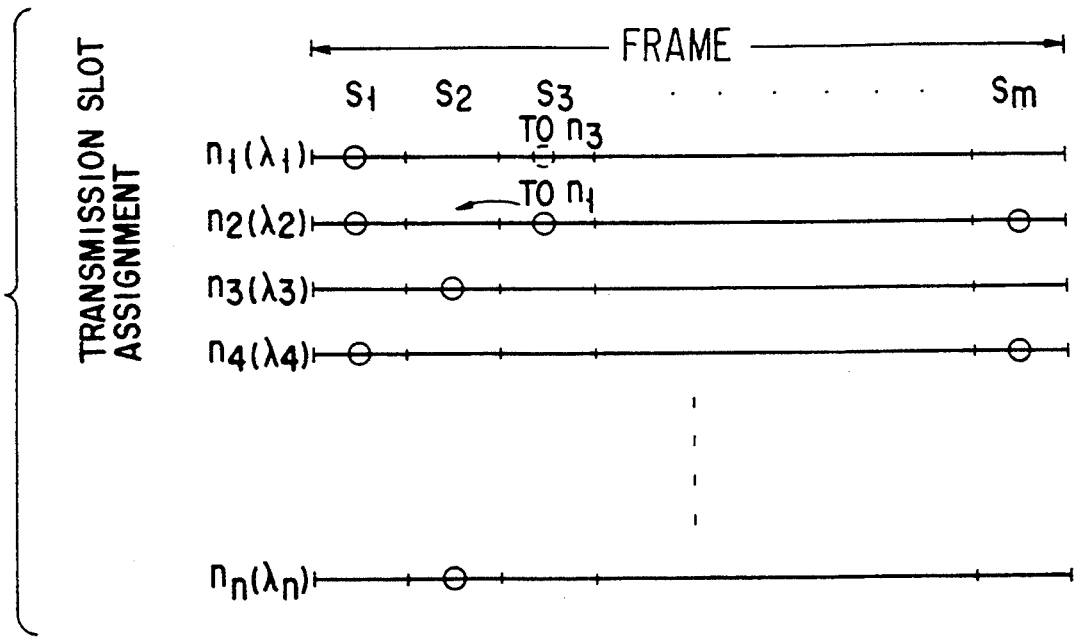
FIGS. 7A and 7B are timing diagrams for use in explanation of the transmitting and receiving time slot allocation control in the first embodiment.
Figure 7B:
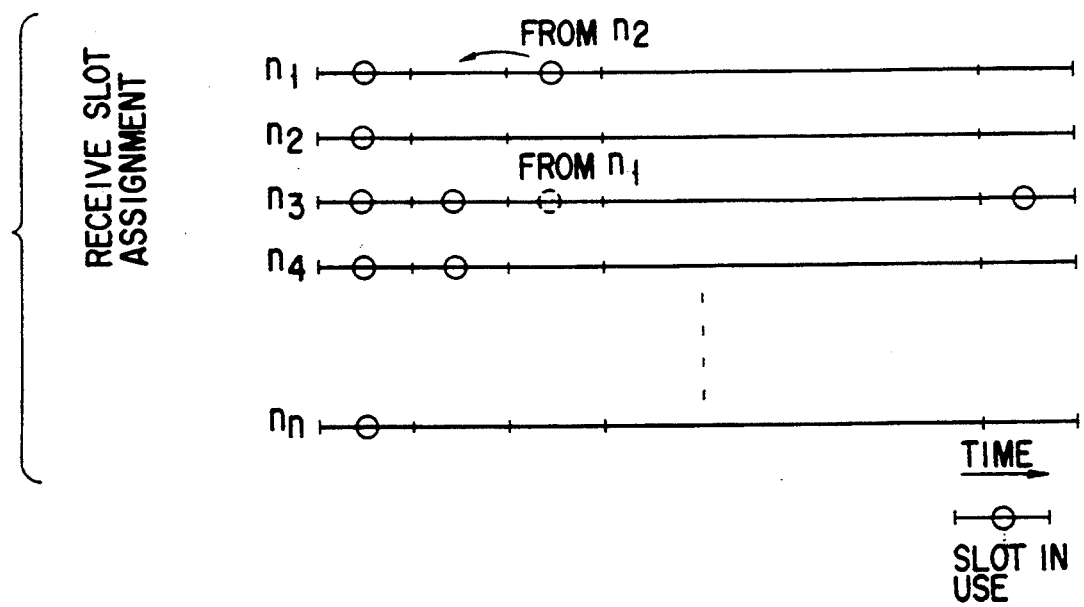
Figure 8A:
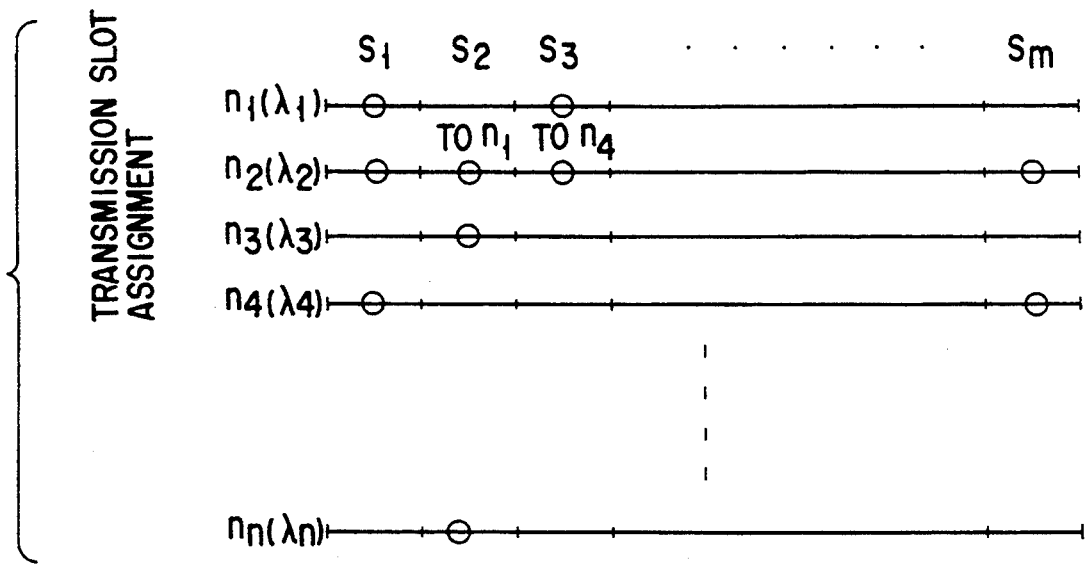
FIGS. 8A and 8B are timing diagrams for use in explanation of the transmitting and receiving time slot allocation control in the first embodiment.
Figure 8B:
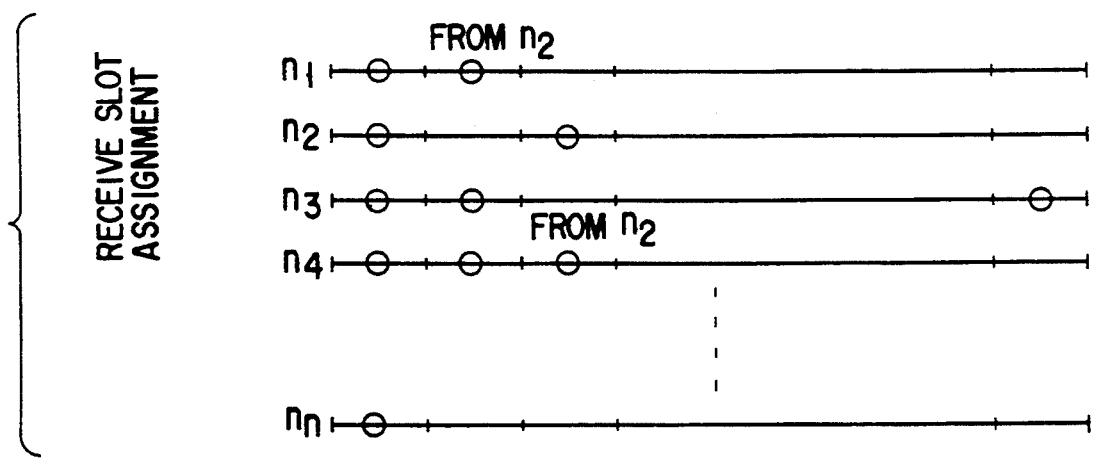

FIGS. 7A and 7B and FIGS. 8A and 8B illustrate time scheduling for data transmission and reception. More specifically, FIGS. 7A and 8A show time slot allocation to transmitters, while FIGS. 7B and 8B show time slot allocation to receivers. S1 to Sm indicate time slots, and the time slots labeled with a circle represent time slots that are being used for transmission or reception. The system used here is configured such that for data transmission each node employs a fixed wavelength unique to that node and for data reception each data receiver switches its receiving wavelength for each transmitter. A different system configuration is also permitted in which transmitting and receiving wavelengths are both variable. In this case, however, the transmitting wavelength should be changed not to cross another wavelength while changing. For example, as shown in FIG. 5, it will be required to interpose the optical switch 27 between the data transmitter 21 and the WDM coupler 25 so that no light may be sent to the wavelength multiplexing network 1 until the transmitting wavelength is stabilized at a correct value.

It is assumed here that a frame includes m consecutive time slots and data transmissions are made on a frame-by-frame basis. This repeating characteristic, that is, the characteristic that the once reserved slots can be used for all frames until the bandwidth reservation is canceled, guarantees the bandwidth for calls. However, with respect to the bandwidth guarantee, it is also possible to make data transmissions without defining a frame such that, for example, data transmissions are made to a certain node at intervals of 10 time slots and to another node at intervals of 20 time slots.

Suppose now that, in the state of FIGS. 7A and 7B, a new request for transmission, for example, from node n1 to node n3 is generated. In this case, node n1 sends through the control channel to the network controller 3 a control signal which indicates that the destination node is n3 and how many slots are newly required. In response to this, the network controller 3 searches a common portion of transmission empty time slots of node n1 and reception empty time slots of node 3 for a common empty time slot. Suppose here that the request for transmission by node n1 needs one time slot within a frame. In the case of FIGS. 7A and 7B, the time slot S3 is empty in common to the transmission of n1 and the reception of n3. Thus, the network controller 3 instructs node n1, through the control channel, to transmit data to node 3 in the time slot S3 in successive frames starting with the next frame and informs node n3, through the control channel, that data will be transmitted from node 1 thereto in the time slot S3 in successive frames starting with the next frame. If a request to send were severe on delays, it would also be possible to allocate a time slot in the latter part of a frame so as to permit transmission from the current frame, not from the next frame.

When the slot allocation is determined in that manner, even if a certain node ni issues a request for transmission to another node nj in a large number of time slots, the network controller 3 can instruct node ni to reduce its traffic for transmission to node nj when another node is also issuing a request for transmission to node nj or it can be anticipated that another node will issue such a request. This will prevent the network 1 from falling into confusion due to particular nodes.

If, on the other hand, a common empty time slot cannot be found, time slot allocation can be rearranged to create a common empty time slot. For example, suppose here that, in FIGS. 7A and 7B, node n2 is requesting data transmission to node n4 in one time slot within a frame, but there is no common empty time slot for transmission by node n2 and reception by node n4. Giving attention to data transmission from node n2 to node n1, it will be seen that the slot S3 is used for transmission to node n1. Thus, the transmission slot for node n1 is shifted from slot S3 to slot S2 as indicated by the arrows. As a result, both the transmission slot S3 of node n2 and the reception slot S3 of node n4 will become empty as shown in FIGS. 8A and 8B and the transmission from node 2 to node 4 will be permitted in this slot S3. Then, the network controller 3 informs the associated nodes that the slot for transmission from node n2 to node n1 has been shifted to S2 and the slot S3 is used for communications between node n2 and node n4. Thereby, network confusion can be circumvented.

Here, distributed control will be considered according to which the similar slot allocation is determined on the basis of communications between nodes over the control channel. In this case, node n2 informs node n4 of its transmission empty slot numbers and the number of slots needed for transmissions, while node n4 checks them against its reception empty slot and then informs node n2 that no common slot is available, along with its reception empty slot numbers. Node n2 examines the reception empty slots of node n4 to find out a candidate slot among its transmission slots which will be available in common to node n4 if that candidate slot currently used for transmission to another node is shifted to another slot. Then, node n2 tells its transmission empty slot numbers to that node to which it transmits in that candidate slot and inquires of that node as to whether another slot can be used for communications with node n2 in place of that slot. That is, the distributed control requires a sequence of such very complex procedures as described above.

In contrast, the present invention is arranged such that the network controller 3 is equipped with a time slot allocation table for all of general nodes and the time slot allocation is centrally controlled on the basis of that table. Therefore, the need for nodes to perform such complex procedures as described above in connection with the distributed control is eliminated and the time slot allocation can be made very simply.

It would also be possible to equip each general node with a time slot allocation table and to cause each node to negotiate with any other node about time slot allocation. With this approach, however, problems would arise from delays within the network. That is, there would arise the possibility that, when changes or shifts are made in the time slot allocation in a node, another node may transmit to or issue a request to change the slot allocation to that node before it receives from that node information about the changes or shifts in the time slot allocation. Thus, the negotiation between nodes would be confused. In order to avoid such confusion, it would be required that all the general nodes have much the same functions as the network controller and operate with a common deterministic algorithm. This would result in a significant increase in the amount and cost of hardware required. It is therefore of great advantage for a single network controller to decide the allocation of time slots for transmission and reception to all of general nodes as with the present embodiment.

As another solution of the problem of no common empty slot being found such an approach as described below in connection with another embodiment can be taken.

FIG. 9 is a schematic illustration of an optical communication system according to another embodiment of the present invention. One of general nodes 2, labeled with nr, is used as a bucket relay node. An approach taken by the present embodiment when the network controller 3 cannot find a common empty time slot is such that, as shown in FIG. 10, a transmission node transmits data to the relay node nr temporarily and the node nr then retransmits the data to the reception node. As with FIGS. 7A and 7B, FIGS. 10A and 10B illustrate the case where node n2 wants to transmit to node n4 in one time slot within a frame, but there is no common empty time slot available to transmission node n2 and reception node 4. In this case, the transmission node n2 transmits data to the relay node nr in the time slot S2 and subsequently the node nr relays the data to the reception node n4 in the time slot S3.

Although, in FIGS. 10A and 10B, one of general nodes 2 is used as the relay node nr as well, a node dedicated to relay may be provided instead. Further, the network controller 3 may have the bucket relay feature built in.

In transmission from a certain node ni to another node nj, if a time slot or slots which have been used so far become empty as a result of the completion of the transmission or a decrease in the number of time slots to be used, node ni sends to the network controller 3 information as to when and which time slot becomes empty, at the time when node ni knows a slot or slots will become empty. Or, at the completion of the transmission, i.e., at the time when the time slot or slots become empty, node ni may informs the network controller 3 that a time slot or slots have become empty. In this way the network controller 3 always knows time slot usage. The processing of the network controller 3 may include management on a call-by-call basis. However, this increases the quantity of processing. It is therefore desirable that requests for transmission, etc., be made on a slot-by-slot basis and how to employ the inside of a slot be left to each general node. The reason is that if, when a new call is originated, the residual part of a slot that has been set already can deal with the call, then a request for a new slot will no longer be needed.

In order to use each optical transmission channel allocated a specific wavelength on a time-division-into-slot basis as in the optical communication system of the present invention, it is required to synchronize the slots on the respective channels identically so that their timing will not change from wavelength to wavelength, i.e., from channel to channel. That is, where the wavelength multiplexing optical network 1 is of a passive star type as shown in FIG. 2A, if light signals from nodes arrive at the star coupler 4 synchronized as indicated in FIGS. 7A and 7B, then the star coupler mixes those light signals which receivers can receives correctly. For this purpose it is necessary that one node or the network controller issue a timing signal and the nodes make transmissions synchronized to the timing signal, provided that each node knows the time ti which is the time for light to travel from the node to the star coupler.

Assume that the network controller 3 transmits a timing signal to each node over the control channel. In this case, it takes ti seconds for the timing signal to arrive at the node ni after passage through the star coupler 4 and similarly it takes ti seconds for the head of slot from the node ni to arrive at the star coupler 4. If the node ni transmits the head of slot 2 ti seconds before the timing signal arrives at the node ni, then the head of slot from the node ni and the timing signal will arrive at the star coupler 4 at the same instant, so that they are mixed together synchronized. If the timing signal is issued periodically like once per slot, once per frame, or once every several slots, then it will also be possible for the node ni to transmit the head of slot 2 ti seconds before as described above.

Note that the time ti may be calculated from the length of the optical fiber cable 5 which is measured at the time of installation, or may be obtained by actually measuring the round-trip time for signal from/to the star coupler. As described above, the timing signal can be transmitted over the control channel. Alternatively, the network controller 3 may transmit data over the data channels to nodes once in a frame.

Similarly, when the wavelength multiplexing optical network 1 is a ring network as shown in FIG. 2B, the network controller 3 simply transmits a timing signal at regular intervals to nodes over the control channel so that each node can transmit data accordingly.

The control channel is a simpler transmission/reception system than the data channels. Thus, basically the control channel itself will have no multiple channels of wavelength division multiplexing. Even if it has multiple channels, each of up and down channels will merely use a separate wavelength or a separate cable as shown in FIG. 11B. In these cases, all the nodes will transmit control signals over the control channel using the same wavelength. It is therefore required to determine a protocol including the order in which the nodes make transmissions. For example, as shown in FIGS. 11A and 11B, at upload time, i.e., when general nodes transmit control signals to the network controller 3, time division multiple access may be used by which time slots on the control channel are preallocated to the nodes for transmission to the controller, while, at download time, i.e., when the network controller 3 transmits a control signal to each node, time division multiplexing may be used in which the network controller transmits a control signal to each node sequentially. Further, the length of a frame on the control channel and the length of a frame on the data channel need not be equal. For more flexible management, it is desirable that one data frame should contain multiple (if possible, an integer number of frames) control channel frames.

Next, a description will be made of countermeasures against a failure in the network controller 3 or a failure in a backup network controller which will be described later. For such countermeasures, the network controller 3, or its backup, or each general node 2 is arranged to have a function of detecting a failure in the network controller 3, and when a failure in the network controller 3 is detected, the time slot allocation scheme is switched to such a preassign allocation system as shown FIGS. 12A and 12B or a distributed system admitting that communication throughput will be reduced.

The preassigned allocation system is a method in which time slot allocation is fixed, and determined. In the example shown in FIGS. 12A and 12B, the time slot allocation is made so that bandwidth which one node can transmit to each of the other nodes is equal and one node can receive data from the other nodes in sequence. As an alternative, each node may tell its traffic required for a respective one of the other nodes in advance, so that appropriate time slots will be allocated to a node pair that requires a high traffic volume. Still another method may be used in which the time slot allocation at the time a failure occurred in the network controller 3 is preserved. This method, which reduces the blocking rate and throughput but is very simple, is useful especially for the case where it is expected that the network controller 3 will be repaired relatively quickly.

The distributed control is a method by which, as described above, the time slot allocation is determined through communication between general nodes via the control channel. If there are few empty time slots, the negotiation between nodes will become very complicated, taking a long time. In the case that there is a great change in traffic, there arises the possibility that a node may simultaneously send signaling information with a plurality of nodes and responses may be returned at the same time, resulting in confusion. Thus, the use of the distributed control will require much time to settle the state of confusion. As a result, the slot setting failure increases and throughput is reduced. However, a system in which each node has relatively many empty time slots for transmission and reception and changes in the traffic are small will adequately accommodate even this distributed control. The distributed control system has a lower blocking probability and a smaller reduction in throughput than the preassigned allocation system.

In order to permit the switching of the allocation system to the preassigned system or to the distributed control system, the present embodiment incorporates self-diagnostic functions into the network controller 3 and the general node 2, for detecting basic failures. However, it may also be possible that a failure that cannot be detected by that self-diagnostic function occurs in the network controller 3. To detect such a failure in the network controller 3, therefore, a monitor station 7 that is equipped with a transmitter and receiver (transmitter and receiver for at least control signals) is connected to the network controller 3 as shown in FIG. 14A. Considering that possibly of a failure in the electric supply such as a blackout may occur, the monitor station 7 may be attached to a different location in the network as shown in FIGS. 14B and 14C instead of being attached to the same location in the network as the network controller 3 as shown in FIG. 14A. The monitoring station 7 may be a stand-alone dedicated device, or any one of the general nodes 2 may serve as the monitor station.

Since there also arises the possibility of a failure in the monitoring station itself, a system that can afford cost should preferably be provided with a plurality of monitoring stations. Giving details, a plurality of dedicated monitoring stations may be provided, or the back up network controller may also have the monitoring functions built in, or some general nodes which are also arranged to perform the functions of the monitoring station 7 may be provided.

When the monitor station 7 or a general node 2 with built-in monitoring functions detects some trouble or fault of any other device or node, it decides whether or not that fault is due to its own failure, by the use of its self-diagnostic functions. In this case, however, the self-diagnostic functions can also fail. Therefore, when that failure is not its own, that monitor station or node which detected the fault makes sure, through the control channel, whether other devices or nodes than a failing device or node also detected that failure, prior to the execution of an operation that significantly affects the system operation, for example, such an operation as interrupts the transmission from the network controller 3 of a control signal over the control channel or such an operation as stops the network controller 3. In this case, if the system is configured such that, every time they detect a failure in any other device or node, each device or node transmits that information over the control channel, then the control channel has only to be monitored. Otherwise, it is necessary to make inquire of other nodes about the occurrence of a failure through the control channel. After a failure has been confirmed, an operation that significantly affects the system operation is performed. If, on the other hand, a device or node could not make sure of a failure, there is the possibility of its own failure. In this case, that device or node must inform the network controller 3 or a network manager of the failure of the device or node.

The monitor station 7 monitors the contents of information sent from or to the network controller 3 and is careful about the presence or absence of abnormality (failure). Upon making sure of fault, the monitor station 7 issues an alarm signal to the network controller 3, the network manager or the whole system, or all via the control channel. When the monitor station 7 is directly connected to the network controller 3 as shown in FIGS. 14A and 14B, the alarm signal is sent to the network controller 3 or the network manager over the direct-connection line. If not directly connected as shown in FIG. 14C, the monitor station 7 can send an alarm signal over an external separate network such as a public network. As an alternative, a wavelength dedicated to the transmission of an alarm signal may be used or a time slot dedicated to the transmission of an alarm signal may be provided on the control channel.

Upon detecting fault in the network controller 3, the monitor station 7 first informs the network controller 3 of it as described above to thereby cause the network controller 3 to perform its self-diagnostic functions. At this point, the monitor station may issue to the whole communication system an alarm signal the duration of which, as shown in FIG. 15B, is not so long as to disturb the communications. When this alarm does not lead to recovery and the failure is not of the self-diagnostic functions and when the fault of the network controller 3 is so severe that the communication system cannot operate, the monitor station is allowed to issue such alarm signals as are superimposed upon control signals as shown in FIG. 15A. When the severity of the fault is so light that the communication system is not much affected, on the other hand, pulse-like alarm signals may be issued between control signals, for example, between guard times in the TMDA as shown in FIG. 15B. In this case, it is desirable that types of pulses for forming alarm signals be determined in advance according to the contents of fault as shown in FIG. 15C. Thereby, it is known from alarm signals which type of fault has occurred.

Figure 21:
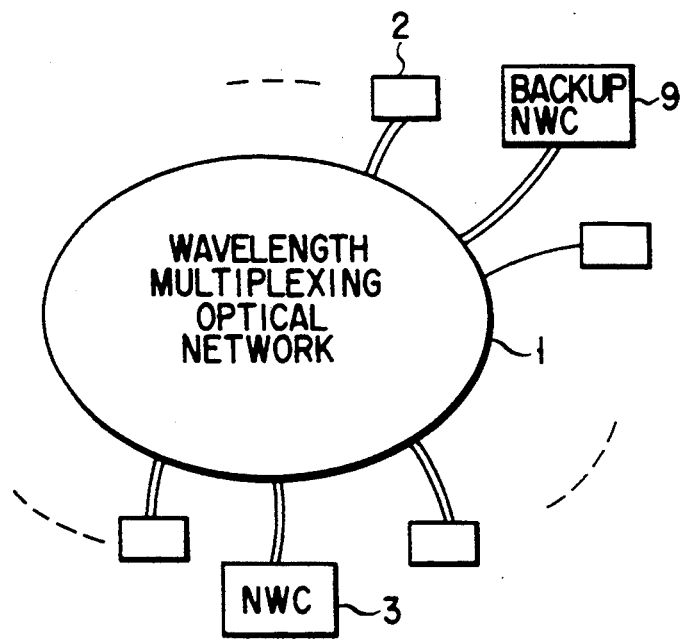
FIG. 21 is a schematic representation of a dual-network-controller optical communication system in accordance with an eighth embodiment of the present invention.

The monitor station should preferably be authorized to stop the network controller 3 when the fault of the controller is so severe that immediate recovery is difficult. If, as shown in FIG. 21, there is provided a backup network controller 9, switching may be made to the backup network controller 9. In this case, the monitor station will work only to detect a failure in the backup controller 9.

The operation for stopping the network controller 3 can be performed easily when the monitor station 7 is directly connected to the network controller 3 as shown in FIGS. 14A and 14B. When the monitor station is not directly connected to the network controller as shown in FIG. 14C, the monitor station can notify the network manager and request to stop the network controller 3. Alternatively, a function may be provided which is responsive to reception of a special signal via the control channel to cause the network controller 3 to stop (in the presence of the backup controller 9, a function of activating the backup controller 9). The monitor station 7 can issue such a special signal.

Further, when both the network controller 3 and the backup controller 9 stop or are stopped artificially, each node is told when to perform communications and which protocol to use for communications. For example, the monitor station 7 simply transmits that information to nodes during a time interval that the network controller 3 transmits or is scheduled to transmit control signals over the control channel. It is preferred that each general node take actions to keep the time slot allocation unchanged for a time interval between the time when a serious fault occurred in the network controller 3, i.e., when the monitor station 7 transmitted information about the occurrence of such fault, or the monitor station 7 issues a signal to stop the network controller 3 and the time a command is received from the monitor station 7.

The monitor station 7 need not necessarily be provided. Each general node 2 can detect at least network controller's wrong operations related to the general node 2, that is, for example, a time slot allocated to it though it has not present a request for transmission and a new time slot allocated to it is the same slot as one currently in use. In such a case, that node informs the network controller 3 of the occurrence of a wrong operation through the control channel first of all. If it is not possible that the network controller makes a recovery from the fault and when control signals are transmitted over the control channel in the form as shown in FIG. 11A or 11B, a specific node (preferably a node that seldom stops, like the node serving as the gateway to a public network), of the general nodes each of which can receive not only transmissions from the network controller but also transmissions from the other nodes, preferably attempts to listen to transmissions from the other nodes all the time, and a node that detected the fault informs that specific node of the fault of the network controller and its degree. The specific node then notifies the network manager of this fact through a public network, a hot line, or the wavelength multiplexing network 1.

When a further serious fault occurred in the network controller 3, the specific node signals over the control channel to switch from the network controller 3 to the backup controller 9. In the event of a failure in the backup controller or in the absence of the backup controller, the protocol is changed to the backup protocol. This decision may be made either by the specific node or by the network manager, which varies between systems. This approach is applicable not only to fault in the network controller 3 but also to fault in any node. When communications between nodes are not performed correctly, this state can be detected immediately because a node cannot receive data from the other node correctly. In this case, that node simply notifies the network controller 3 of this fact. Then, the network controller 3 will direct the node which has a fault to attempt recovery from wrong communications.

As a simpler method of dealing with fault in the network controller 3, a method may be considered which deals with the fault in the network controller 3 only when it fails to the extent that any node can detect the fault. This includes cases where the network controller will not make transmissions over the control channel, where the transmission power on the control channel is abnormally low, and where the timing of transmissions on the control channel is wrong obviously, and so on. Further, this method is also applicable to the case where the network controller has detected a fail in itself and thus cannot operate.

In these cases, upon detecting fault, each node informs the network controller 3 or other nodes of this first of all. In case where recovery is impossible, the network controller itself may direct, if possible, each node to switch the protocol. If not possible, a specific node, which has been determined in advance, commands any other node to switch the protocol. The specific node have been selected to be any one of the nodes. However, it is possible that, in a LAN (local area network), especially in a wavelength division multiplexing LAN, some nodes are idle. Therefore, for example, the order in which each node issues a command may be determined in advance. In this case, the determination may be made such that the first node issues a command first, and, in the event that the first node will not issue a command even after a wait of a predetermined length of time, the second node issues a command. It is also possible that a situation takes place in which the command-issuing-node believes that a failure have occurred in the network controller but, in fact, the node has failed. Thus, it is preferable the node should issue a command after making sure whether other nodes are also complaining of a failure in the network controller.

When it is known that a failure has occurred in a node itself, that node notifies the network controller of its fail. If that node has a manager, he or she will be notified of its fail. The network controller notifies the network manager. Depending on the severity of the failure in that node, the network manager takes measures including disallowing that node to change its time slot allocation, forbidding that node to communicate, etc. The other nodes are also informed of the fault of that node and its degree.

In the above-described optical communication system, control signals, which are normally used to determine the time slot allocation, may serve as timing signals indicating the timing of data transfer as well. In order to preserve the proper timing in the event of a failure in the network controller, therefore, it is preferable that a general node or a monitor station that instructs switching of the protocol transmits the proper timing signals in place of the network controller or direct any one of the general nodes to transmits the proper timing signals.

Next, the broadcasting/multicasting facilities of the optical communication system of the present invention will be described.

The broadcasting/multicast function are important to a LAN. An attempt to implement these facilities with an optical communication system like the present invention may cause the possibility that no receiving empty time slots are available in common to all of the destination nodes. For this reason, the network controller manages and arranges transmit and receiving time slot allocation of nodes so that, on the occurrence of a request for broadcast/multicast, it can be permitted immediately.

To be specific, several time slots near the end of a frame are kept empty all the time for the sake of a request for broadcast/multicast. On the occurrence of a normal request for transmission other than broadcast/multicast, therefore, time slots for transmission are examined beginning with the first time slot in the front portion of a frame. When data cannot be transmitted unless the time slots preserved for broadcast/multicast are employed, those time slots are employed to start transmitting data for the time being. As described in connection with the time slot allocation method, another common empty time slot for transmission and reception are then set up by rearranging the allocation so that the transmission in the broadcast/multicast slot moves aside and broadcast/multicast slot be empty.

In order to circumvent such a situation as much as possible, it is preferred that the network controller controls pairs of nodes which transmit data in time slots in the backward portion of the frame in such a way as to shift their time slots to the forward portion of the frame. For example, a list of a set of time slots which should preferably be shifted is created on the basis of time slot allocation table. When any one of the time slots becomes empty, calculations are started to examine whether it is possible to shift one or more of the set of time slots in the list using the new empty time slot. If the network controller has processing capabilities to spare, whether it is possible to make efficient time slot allocation in which time slots are crammed more forward may be examined. Depending on the capabilities of the network controller, the calculations may be performed using a dedicated processor that is built into the controller or may be performed between normal control operations.

Instead of time slots being crammed as forward as possible within the frame as described above, they may be crammed as backward as possible. For the same control it is also possible that time slot numbers which are to be left empty for broadcast/multicast and their priority are determined in advance.

In an optical communication system which uses wavelength division multiplexing and time division multiplexing in combination as in the present invention, one time slot can become very long in duration (10 to 100 times) in comparison with a cell that is a unit of information transfer in ATM (asynchronous transfer mode) switching. When the optical communication system of the present invention is used as a backbone LAN, data from multiple terminals on a lower network connected to the sending end will be grouped together into one slot and then transmitted to multiple terminals on a lower network connected to the receiving end.

For broadcast/multicast communications, it is preferable that transmit data from one node for broadcast/multicast always have enough quantity to fill one time slot. If, however, only one terminal on a lower network, which is allocated one time slot, transmits data, the time slot can may nearly empty. This might be allowed in the case of only one-way broadcast/multicast communications. However, with a system in which several nodes are interconnected to both transmit and receive, such as a video conference system, a lot of time slots might be occupied with each slot nearly empty, resulting in poor efficiency.

Figure 13A:
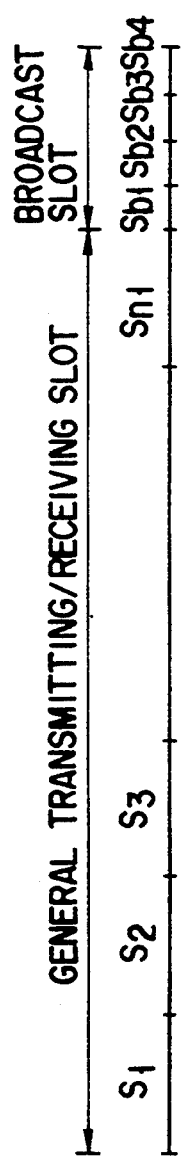
FIGS. 13A and 13B are timing diagrams of time slot allocation control in performing broadcast in accordance with a fifth embodiment of the present invention.

Accordingly, it is preferable that time slots kept for broadcast/multicast communications be set shorter in duration than other time slots as shown in FIG. 13A. Of course, it is allowed to use these short time slots for normal transmission and reception in case where other time slots for normal communications cannot be employed.

Figure 13B:
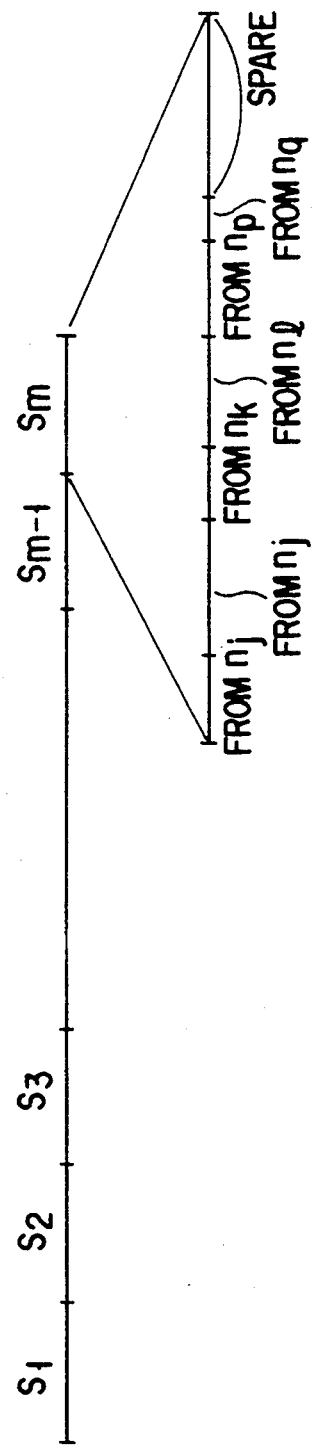

For broadcast/multicast communications as in the video conference system described above, each node specifies its specific traffic required and accordingly the network controller divides one or more slots into new time slots each of which has a different duration. FIG. 13B shows such a state. For example, a normal time slot is subdivided according to the amount of information to be transmitted. If the amount of information cannot fit into one time slot, the use of as many time slots as is needed is allowed.

Further, separate information can be inserted into an empty portion of a time slot. For example, when one node transmits a plurality of broadcast/multicast communication data, they can be grouped into one time slot, and data for a specific node can be inserted into an empty portion of that broadcast/multicast time slot.

With an application in which, as in a video conference system, there are many broadcasters and large delays are allowed, it will be allowed that broadcasters at nodes transmit data to one specific node in the normal transmission and reception manner and then, at that node, the data are crammed into one time slot.

If a common reception empty time slot is unavailable for all the destination nodes of the broadcast, the following approach could be taken. For example, if one common empty time slot is unavailable, the destination nodes are divided into groups each of which has a common empty time slot available, and a broadcasting node transmits the same information as many times as there are groups. At this point, in case where there is a group to which the broadcast node cannot transmit, the information can be relayed to that group. This relay may be performed by the above-mentioned relay-only-node, or the network controller, or another general node. And, if a node that can transmit in a common empty time slot available to a group to which the broadcasting node cannot transmit is present within a group to which the broadcasting node can transmit, that node is permitted to relay the information.

Next, the expansion of the wavelength multiplexing optical communication system of the present invention will be considered. If the wavelength multiplexing optical network 1 is of a passive star type as shown in FIG. 2A, it is difficult to expand the network beyond the number of ports that the star coupler 4 has. The reason is that, although the use of a coupler permits the attachment of two or more nodes to a single port, problems arise with these nodes in that light intensity for transmission and reception is lowered and reception sensitivity degradation occurs. Countermeasures against the degradation problem will involve the insertion of an amplifier in the light transmission path or the provision of a transmitter-receiver that is good in transmission power and reception sensitivity, both increasing hardware cost. In the fixed transmission-wavelength system, on the other hand, one node is allocated one transmitting wavelength. Thus, there is a limit on the number of the wavelengths, i.e., the number of nodes because each receiver has a limited wavelength range over which receiving wavelength can be varied.

FIG. 16 shows an expansion of the wavelength multiplexing optical network 1 that removes such a limitation. The improved network is configured such that a gateway 8 is connected between wavelength multiplexing optical networks 1. The gateway 8 is arranged as shown in FIGS. 17 to 20.

The gateway 8 shown in FIG. 17 is constructed from a gate way receiver 31, a signal processor 32 and a gateway transmitter 33 which are connected in cascade. A light signal directed from the sending wavelength multiplexing optical network to the receiving wavelength multiplexing network is converted by the gateway receiver 31 into an electrical signal, which, in turn, is processed appropriately by the signal processor 32 and then converted by the gateway transmitter 33 into a light signal for retransmission. The gateway receiver 31, signal processor 32 and gateway transmitter 33 are each provided one or more in number, depending on the traffic. Each of the receiving wavelength of the gateway receiver 31 and the transmitting wavelength of the gateway transmitter 33 is selected to conform to the respective corresponding network.

Figure 18:
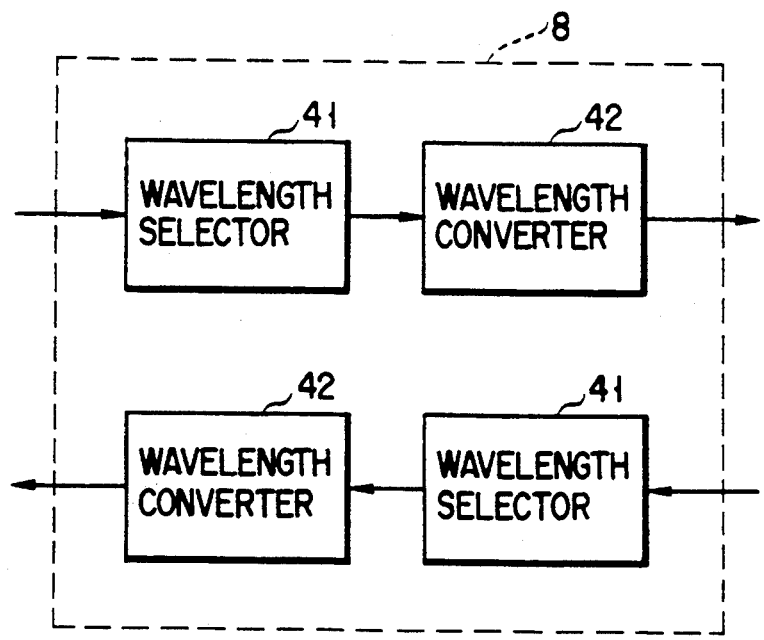
FIG. 18 is a block diagram of the gateway of FIG. 16.

The gateway 8 shown in FIG. 18 is comprised of a wavelength selector 41 and a wavelength converter 42. The wavelength selector 41 selects a transmission time slot specified by the network controller 3, and the wavelength converter 42 converts an optical signal in the selected time slot into an optical signal of a wavelength that is specified by the wavelength multiplexing network on the receive side.

Figure 19:
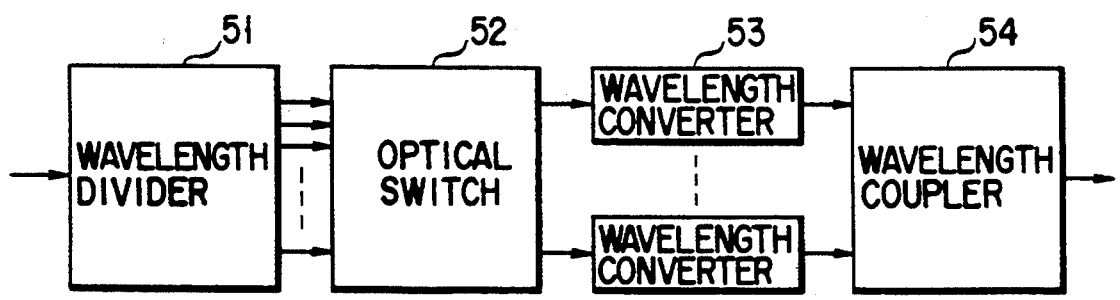
FIG. 19 is a block diagram of the gateway of FIG. 16.

More specifically, as shown in FIG. 19, a wavelength divider 51 divides an optical signal from the sending wavelength multiplexing network into wavelengths. An optical switch 52 receives these wavelengths and selects time slots addressed for the receiving wavelength multiplexing network. Next, wavelength converters 53 perform wavelength conversion. Finally, a wavelength coupler 54 combines wavelengths from the wavelength converters 53 for transmission.

Figure 20:
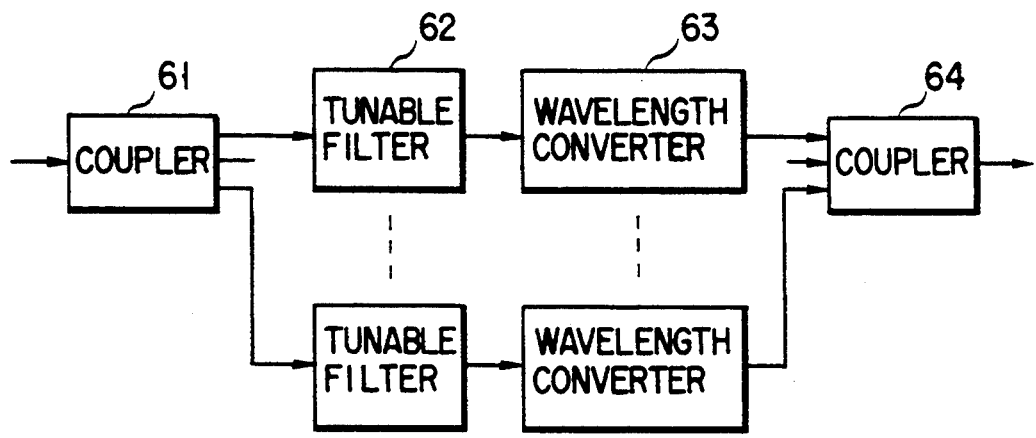
FIG. 20 is a block diagram of the gateway of FIG. 16.

As a further alternative, as shown in FIG. 20, a coupler 61 and tunable filters 62 are provided which respectively serve as the wavelength divider 51 and the optical switch 52 of FIG. 19. Optical signals output from the tunable filters 62 are subjected to wavelength conversion in wavelength converters 63 and then combined in a coupler 64 for subsequent transmission.

Next, a method of supporting connectionless data (hereinafter referred to as CL data) in the optical communication system of the present invention. For example, CL data can be supported as follows.

First, a CL data server node 10 is connected to the wavelength multiplexing optical network 1. CL data is temporarily transmitted from a transmission general node 2 to the server node 10 and then transferred from the server node to a reception node. A node to communicate with the server node 10 is different in each frame. And the order of transmission of each node is determined in advance. With a network into which the concept of frames is not introduced, to make data transmission in the same manner as above, it would be required only to split a stream of time slots into successive groups of a predetermined number of slots.

Each general node 2, which is waiting its turn to transmit, inserts CL data, if any, into its transmission empty time slot on arrival of its turn to transmit, i.e., on arrival of a frame during which it is allowed to transmit the CL data. With a high-traffic network in which it is expected that a situation will occur frequently in which there is no empty time slot available in spite of the presence of CL data to be transmitted, the empty bandwidth, i.e., the residual bandwidth of a time slot in use may be used. In this case, it is preferable that a header be attached to CL data so that it can be distinguished from normal data.

In order for the server node 10 to know that the contents of that time slot are CL data, appropriate information may be written into the header of data. Otherwise, simple distinction could also be made on the hardware level.

If, when the wavelength multiplexing network 1 is of a variable transmission wavelength type, a specific wavelength is dedicated to CL data, then the server node 10 is allowed to receive CL data only by tuning its receiver to the transmission wavelength of the CL data. And, when the wavelength multiplexing network 1 is of a fixed transmission wavelength type, it will also be possible to transmit a specific pulse train at the beginning of a time slot. Or, it would also be possible for the server node 10 to communicate with the network controller 3 in advance or monitor the control channel in advance to thereby have a time slot allocation table indicating the transmission and reception time slot allocation to the general nodes 2. In this case, therefore, the server node could receive CL data if a node transmits the CL data in its empty time slot.

The receiver in the server node 10 receives transmitted data from a certain specific node in a certain frame as each of the general nodes 2 transmits CL data sequentially frame-by-frame. The receiver extracts only CL data from that transmitted data and stores it in a memory. At this point it is preferable that CL data be assorted by destination. To this end, the general nodes 2 can transmit CL data to the server node 2 in different time slots varying with destinations. Alternatively, the general nodes 2 is also allowed to simply transmit CL data without caring about their destinations so as to entrust the sever node with data assortment. These approaches vary among networks.

The memory in the server node 10 may be segmented in advance into areas each for a separate destination. In this case, when data is received, it is stored in an area allocated to its destination. Or a tag may be attached to data which permits immediate identification of its destination.

The transfer of CL data from the server node 10 to the general nodes 2 is made in the same manner. That is, the order in which the general nodes 2 receive CL data has been established. Upon arrival of a frame during which a node is allowed to receive CL data, it tunes to transmission from the server node in its receiving empty time slot. The relay node 10 has learned the time slot allocation to the nodes from communication with the network controller 3 in advance or monitoring the control channel and is thus allowed to transmit data to a reception node at its receiving empty time slot. At this point, the server node 10 reads out data destined for that node from the memory and transmits it.

By equipping the network with the CL data server node 10 and making CL data transmission and reception using empty time slots in this way, the need of generating a request to the network controller 3 to carry out the procedures for transmission and reception of CL data and the limitation imposed on the bandwidth used for transmission and reception of normal data due to CL data can be removed. Of course, there is some CL data that is severe on delays. Such data may be transmitted in accordance with the normal procedure or, if a time slot has been set up with a reception node, may be transmitted using its residual bandwidth. At this point, use may be made of that residual bandwidth within a time slot which is generated by the statistical multiplexing effect.

FIGS. 23A and 23B illustrate the ways of splitting a frame into time slots in such a wavelength multiplexing optical network as shown in FIG. 24 in which the number of nodes is n. In FIG. 23A there are 2 n time slots within a frame. As described above, if the number of time slots is twice or more the number of nodes, a great call loss will hardly occur. In a system which has a short guard time for wavelength switching, more than 2 n time slots are permitted as shown in FIG. 23B, which attains increased throughput.

In a network to which the present invention is directed, the number of nodes 2 actually connected to the network depends often on the systems. However, it is often that a maximum number of nodes that can be connected to the network is virtually determined. Thus, the number of time slots can be determined on the basis of the maximum number of nodes. With a network allowed to change the number of time slots, their length, or the length of a frame even at a very low speed (day by day, or month by month), they may be changed when the nodes are changed in number. Changes are allowed not only when the number of nodes is changed but also when the network efficiency and total throughput become unsatisfactory (or are likely to become) because of too many or few time slots in comparison with nodes.

FIGS. 25A to 25E show examples in which the time slots are available in two or more sizes to accommodate traffic unbalance. In this case as well, of course, the number of time slots within a frame is preferably equal to or more than twice the number of nodes. The size and number of time slots to be prepared depends on network traffic conditions.

For example, a network in which traffic unbalance is relatively small may be arranged such that small time slots, which correspond in number to nodes, are prepared first each of which permits transmission of several to several dozen calls used for transferring small files such as telephone calls, electrical mails, etc., and next large time slots, each of which permits transmission of large bandwidth data such as picture data, are prepared. In a network in which traffic unbalance is large, on the other hand, it is preferable that small time slots, the number of which is selected to be less than the number of nodes, be followed by medium time slots and large time slots as shown in FIG. 25C.

Figure 37:
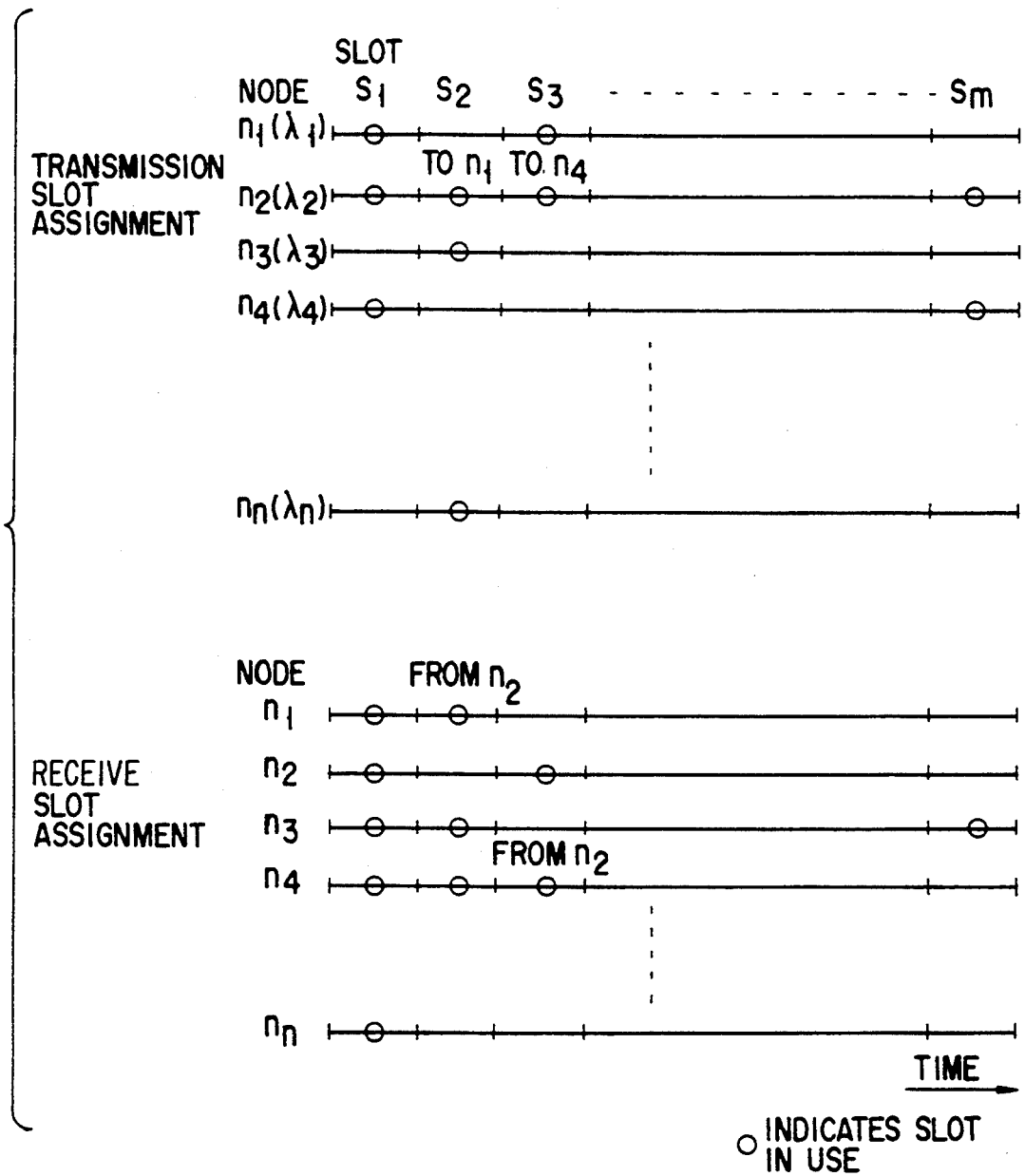
FIG. 37 is a diagram for use in explanation of the basic operation of a network of the present invention, particularly a method of using time slots.

FIG. 25A shows an example in which there are two types of time slots; small and large. FIG. 25B shows another example in which there are available three types of time slots including small time slots adapted for broadcasting described in connection with the above embodiment. In an example shown in FIG. 25C, there are available three sizes of time slots, large, medium, and small. FIG. 25D shows an example in which a frame is split into very small time slots and some of these slots are used consecutively according to traffic volume. In this case, no guard time is taken between each time slot of the consecutive slots, which is equivalent to changing the length of each time slot. In the example of FIG. 25D, the times when the receiving wavelength is actually changed are indicated by arrows. Thus, an increase in the number of insertions of guard time is not so significant as to reduce efficiency. As shown in FIG. 25E, a frame may be divided at any point without being split into small regular time slots. In the wavelength multiplexing network of the present invention, the receiving wavelength is switched for each transmission node as shown in FIG. 37. If, therefore, ways of splitting a frame into time slots vary among transmission nodes, there arises the possibility that a very complex algorithm may be required to adjust time slot mismatch between nodes.

Figure 26:
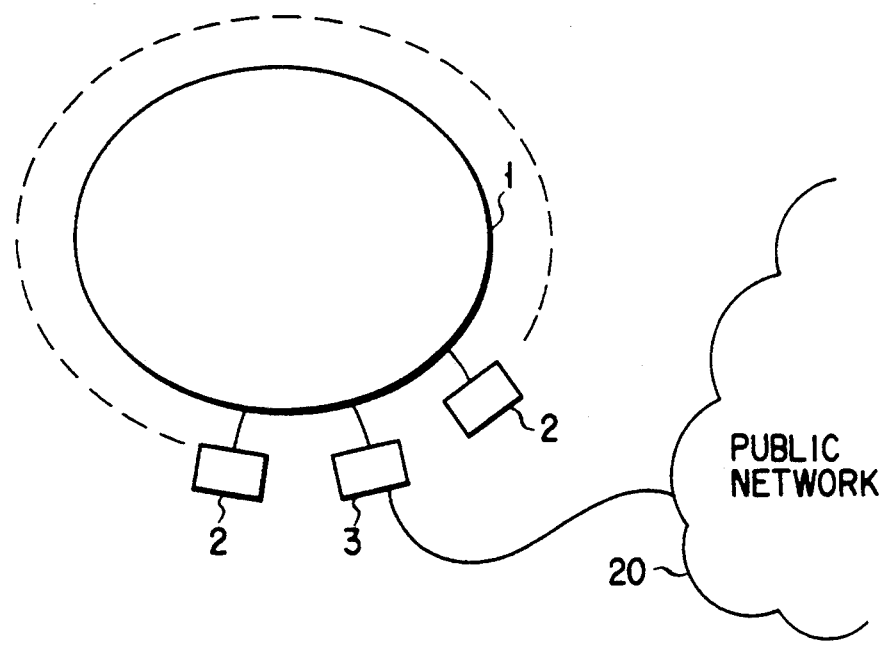
FIG. 26 shows a communication network in which a network controller serves as a gateway to a public network in accordance with a thirteenth embodiment of the present invention.
Figure 27:
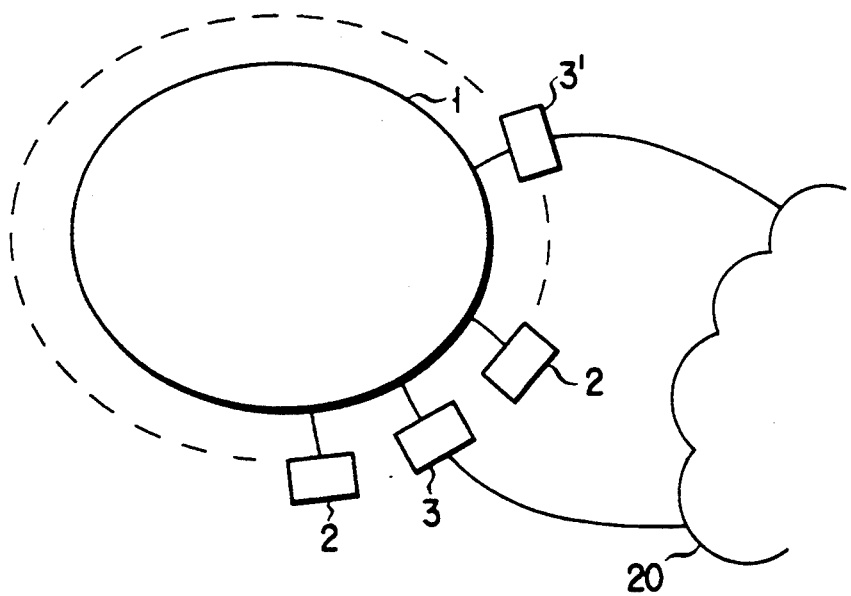
FIG. 27 shows a communication network in which a network controller acquires clocks from a public network in accordance with a fourteenth embodiment of the present invention.

FIG. 26 shows a system configuration in which, in order to synchronize clocks on the wavelength multiplexing network of the present invention to clocks of a public network, the network controller 3 extracts clocks from the public network and distributes them to each node via the control channel. The network controller 3 is connected to a public network 20 and serves as a gateway to the network 20. Even if the controller is not (cannot be) connected to the public network, it has only to be connected to any line on which clocks synchronized with the public network 20 are available. FIG. 27 shows an example in which a gateway 3' to the public network and the network controller 3 are separate nodes. In this example, the network controller is not a gateway to a public line.

FIG. 28 shows an example in which the gateway node 3' for the public network 20 sends only clocks to the network controller 3 over a direct line.

In this way, the network controller 3 acquires clocks synchronized with the public network. The network controller 3 transmits over the control channel to the nodes 2 at the clock rate. Then, each node 2 is allowed to extract and acquire clocks synchronized with the public network 20.

Figure 30A:
FIGS. 30A, 30B and 30C illustrate examples of a time division of a control channel in a communication network according to a seventeenth embodiment of the present invention.
Figure 30B:
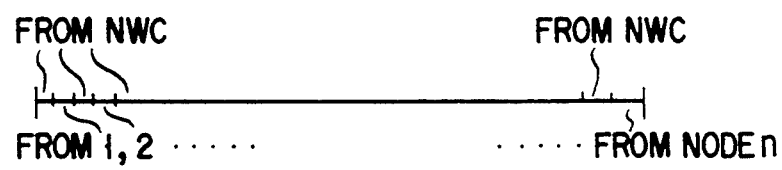
Figure 30C:
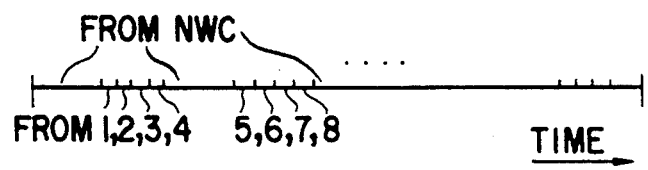

FIG. 29 shows an example of a node in which the control channel is used in a multiplex mode, i.e., wavelength division multiplex (WDM). In this configuration, a WDM coupler 71 connected to an optical fiber 72 is coupled to a data transmitter 76 and a control signal transmitter 77, while another WDM coupler 71 is likewise coupled to a data receiver 78 and a control signal receiver 79. The data transmitter 76 and receiver 78 and the control signal transmitter 77 and receiver 79 are coupled to a node controller 80. In this configuration, the wavelength on the control channel is shared among all the nodes so as in a normal LAN, and the network controller and each node transmit control information on a time division basis. All the control information, once transmitted, will be received by each node. An example of time division multiplexing is shown in FIG. 30. FIG. 30A shows that the network controller 3 transmits information continuously and each general node transmits on a TDMA basis. This method is useful when a time interval during which the network controller makes no transmission is short and each node can keep clocks properly for that time interval, i.e., the signaling nodes are relatively small in number and the amount of information from each general node is small. Otherwise, as shown in FIG. 30B, each general node and the network controller may make transmissions alternately, or as shown in FIG. 30C, the general nodes are clustered into several groups, and one of the node groups and the network controller may make transmissions alternatively. This operation is repeated several times for each node group within the frame period. In this case, the time interval during which the network controller makes no transmission should be kept to within a time interval during which the clocks can be held.

Figure 31A:
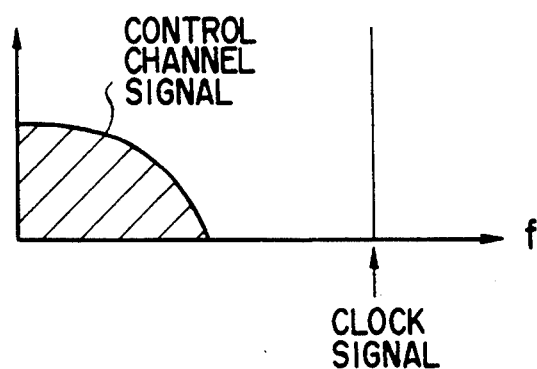
FIGS. 31A and 31B show a method of superimposing a clock signal in a communication network according to an eighteenth embodiment of the present invention.
Figure 31B:
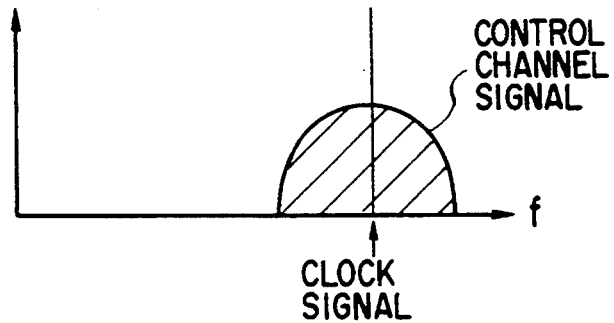

In order to transmit clocks, in addition to the approach by which the clock rate or bit rate on the control channel is synchronized with the bit rate on the public network 20 as described above, an approach can also be taken by which clocks are transmitted at a bit rate which is an integral multiple or an integral submultiple of a bit rate in a hierarchical public network. Further, the bit rate on the control channel can be set arbitrarily and modulate a light of a clock frequency microwave synchronized with the public network on the control channel as shown in FIG. 31A. Alternatively, as shown in FIG. 31B, it is permitted to modulate a microwave of a clock frequency with control information and further modulate transmit light on the control channel with the resulting modulated wave (subcarrier modulation). FIGS. 31A and 31B show transmission spectra at the electrical stage of the control channel of the network controller.

In the case of FIG. 31A, the network controller is allowed to continue to transmit clocks at any time even if any other node is transmitting over the control channel. Thus, the general nodes are enabled to receive clocks all the time. In this case, if, when the control channel is used on a time division basis so as to occupy a light wavelength bandwidth, different nodes make transmissions within the wavelength bandwidth at the same time, their light carriers may interfere with each other, thereby generating beat noise. For this reason, when the network controller transmits only clocks while other nodes transmit control information, it is preferable that the wavelength of the control-channel transmitter of the network controller be kept away from the wavelengths of the control-channel transmitters of the other nodes to the extent that beat noise will not fall within the reception bandwidth.

It may be supposed that, if the approaches as shown in FIGS. 31A and 31B are taken, the bandwidth of the control-channel transmitters and receivers must be broadened. In the example of FIG. 31B, it is certain that the bandwidth must be broadened. In the example of FIG. 31A, however, since it is only clocks that stay in a high-frequency bandwidth, it is not almost necessary to care about reception sensitivity. In this case, since sinusoidal waves of the clock frequency have only to pass through, a few changes need to be made to the bandwidth and form of a filter. For this purpose, however, the transmitter and receiver need not to be replaced with one for a high bit rate.

Figure 32A:
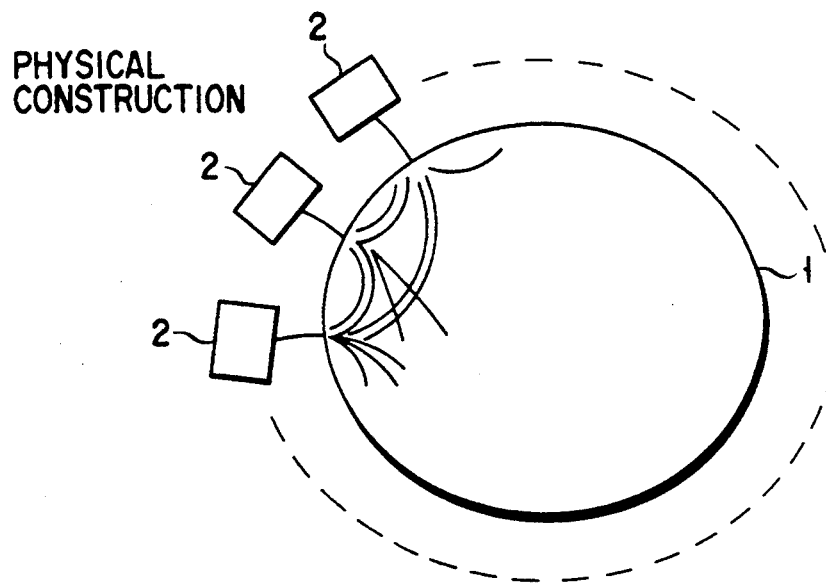
FIGS. 32A and 32B show virtual paths in a communication network according to a nineteenth embodiment of the present invention.
Figure 32B:
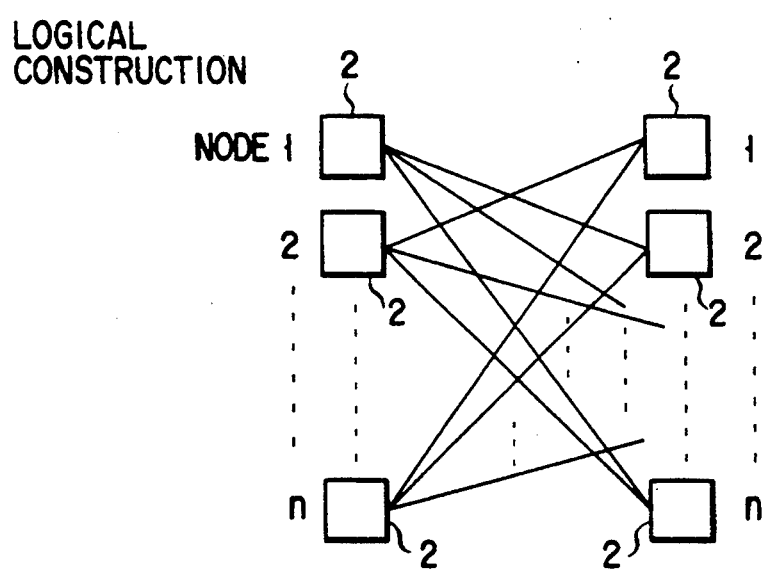

FIGS. 32A and 32B are diagrams for use in explanation of paths within a network. In a network as the present invention, each pair of source and destination nodes are virtually considered to be connected by a line as shown in FIG. 32B. The network provides one or more path identifier to each pair of source and destination nodes (to a single line in FIG. 32B). In the present invention, the "network" specifically refers to the network controller 3. However, a dedicated node, if any, or any one of the general nodes 2 may issue path identifiers.

Basically, in the network a single node is allowed to issue path identifiers. And a transmission from node i to node j and a transmission from node J to node i are each handled as a individual path.

A source-destination pair is given one or more path identifiers, depending on a traffic volume within the pair. The path identifiers are preferably used independently of time slots which are physical segments of the transmit-receive bandwidth. That is, although transmissions are sometimes made to the same node in different time slots as shown in FIG. 33A, these time slots for the same node are treated in a group as shown in FIG. 33B, and the path identifiers are treated in the group quite independently of time slots. A group of time slots shown in FIG. 33B is a group of calls as shown in FIG. 33C. As shown in FIG. 33D, each call has a header with a path identifier, and a channel identifier used to establish its identity. Even calls in the same time slot are allowed to have different path identifiers. If, when the time slot and the path are thus made independent of each other, any call terminates and hence the number of time slots for its destination can be decreased as shown in FIG. 34, then the path identifier and channel identifier will not have to be reissued. If, of course, the termination of a call eliminates the need for the use of its path, the path identifier may be returned to the network.

Figure 35:
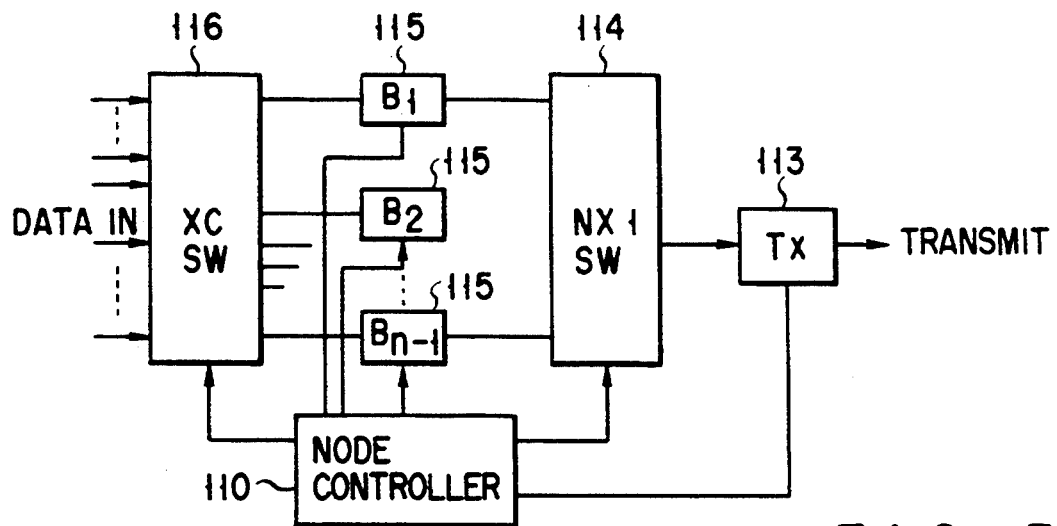
FIG. 35 illustrates a transmission section in which input buffers are arranged by reception node in a communication network according to a twenty-second embodiment of the present invention.

As shown in FIG. 35, the transmitter hardware of each node is equipped with buffers each of which is provided for each of the other nodes (not for each time slot). This configuration permits each node to quickly accommodate such a decrease in time slots. That is, an input switch 116 is connected by multiple buffers 115 (B1 to Bn-1) to an output switch 114 the output of which is connected to a transmitter 113. The transmitter 113, the switches 114 and 115 and the buffers 115 are controlled by a node controller 110.

Normally, a channel identifier for identifying a channel in a path is also issued by the network. In a network like the present invention, which features high throughput. However, a small call may have the bandwidth of telephone. In such a case, a great number of calls would be present in the network. If a single node should centrally process all of these calls, it would have to do a lot of work. The path identifiers need to be managed centrally by the network, thus, the network controller (or another node) will manage them centrally. If, however, the channel identifiers were also issued concurrently, the scale of the network controller would have to be enlarged. In addition, information would also have to be communicated in large quantities on the control channel, resulting in large cost. In the network of the present invention, therefore, it is preferred that each node constructing a source-destination pair issue a channel identifier individually.

As described above an enormous number of calls can exist on the network. Thus, the number of bits used in path and channel identifiers should increase accordingly. As a result, the effective data rate will be lowered. It is therefore desirable that as many bits as possible should be decreased. The number of channels to be contained in a path varies from path to path. If paths that contain few channels were many, then a total number of paths would have to be increased after all. This would result in a significant increase in the number of bits used for identifiers. It is therefore desirable that allocation of path identifiers be performed according to the number of calls within a pair.

Figure 36A:
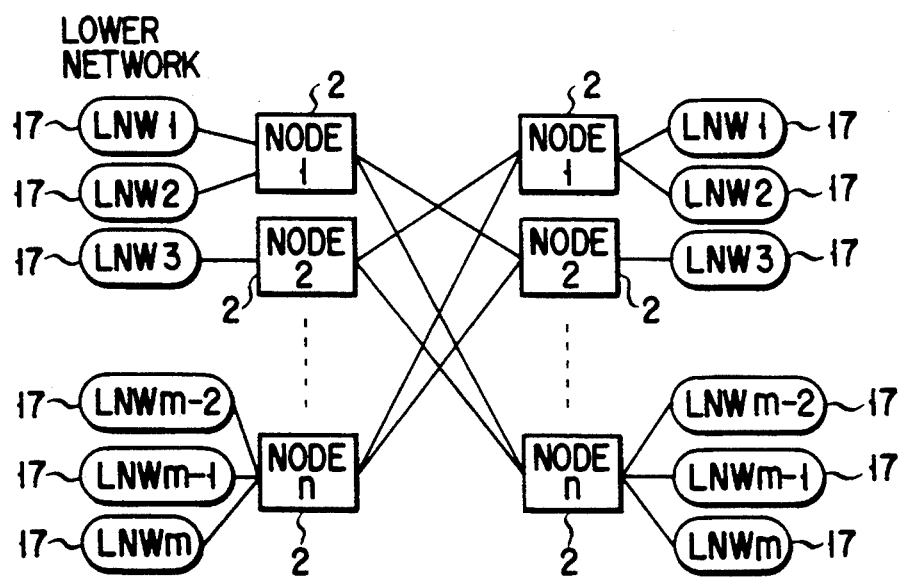
FIGS. 36A and 36B illustrate logical configurations of a communication network according to a twenty-third embodiment of the present invention, which is useful in explaining a method of allocating paths.
Figure 36B:
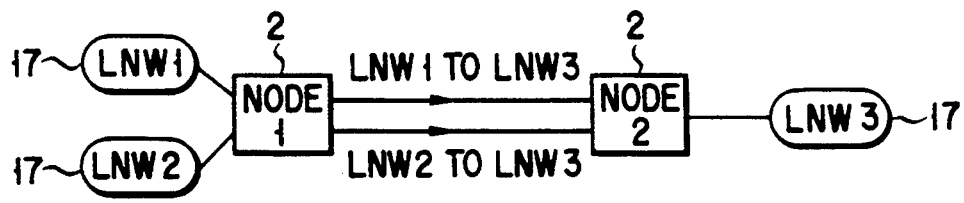

With a network that has high throughput and does not matter even if the data rate decreases slightly, allocation of path identifiers may be performed individually for each lower network. FIG. 36A shows a logical configuration of the network of the present embodiment, in which a lower network or networks 17 attached to each node are illustrated together. FIG. 36B shows a portion of the network of FIG. 36A that is associated with transmission from node 1 to node 2. In this example, transmission from lower network LNW1 to lower network LNW3 and transmission from LNW2 to lower network LNW3 are each allocated a separate path identifier. That is, in this example, path identifier allocation is performed for each transmitting lower network. Alternatively, path identifier allocation to each receiving lower network is also permitted. Furthermore, allocation may be performed for each pair.

A request for a path identifier is made on the basis of a decision as to whether a general node needs a new path identifier. When a node 2 receives a new request for transmission from its associated lower network, that node sees its transmission bandwidth usage (i.e., whether there is room for a new call) to determine if it makes a request for a time slot and a path identifier on the network controller. If there is no room for a requested call, the node will not generate a request to the network controller. If that node is allowed to set the call without network controller's permission, it is preferable that the node should not make notification to the network controller. In this way, it is allowed to make it possible to alleviate the burden imposed on the network controller as much as possible. A decision as to how a call that failed to be set up (whether it is either forced to wait or abandoned) is dealt with may be entrusted to each node. In particular, there is no need of a rule standardized with the network.

It will be considered that in spite of a request for a time slot, the network control is not able to set up the time slot, or although time slot requests are made simultaneously by two nodes, the network controller is able to service only one request. In this case, the concept of grades may be introduced into the network as material for decisions as to how long a request is able to wait for service or which of requests should be given priority over others. That is, requests may be graded according to the time limit until which that time slot must be set up, or the importance of each call. When a contention occurs, a higher-grade request is serviced first. If a request, which was not able to be serviced, is allowed to wait, it is placed in a queue.

In this case, it is supposed that a new time slot request occurs when a request for setting up a new call is made by a lower network. However, more than one request may be made simultaneously. A situation may occur that a plurality of calls are simultaneously made toward the same node and their grades are not equal. In such a case, the node selects higher importance and longer waiting time, which is presented to the network controller. If, with time slot requests placed in the queue, the allowable waiting time of the call of shorter time limit of a request runs out, then the node will notify the associated lower network of blocking on its own judgment. If the number of time slots to be requested is changed for that reason, the node notifies the network controller of it. There is also the possibility that, when a request for time slot is placed in the queue in the network controller, another request for setting of a new call toward the same node may be made by the lower network. In this case as well, the node determines its importance and time limit. If needed, the node informs the network controller of the change of situation and a change of the number of time slots to be requested, if any.

The introduction of quality classes subsequent to setting up of calls will attain increased total throughput due to the statistical multiplexing effect. With a system that does not allow for the loss of information and delay jitter within a call at all, upon reception of a call setting request from a lower network, the associated node must allocate the bandwidth within a time slot in such a way as to always ensure its maximum bit rate and make a request for a time slot. If so, within the bandwidth requested, any bandwidth variation could be accommodated. With a call which will not always communicate at the maximum bit rate, the bandwidth will remain unused during most of the time and another call cannot employ the remainder of the bandwidth, resulting in reduced efficiency. On the other hand, the future information communication technology is considered to progress in the direction of extensive use of the ATM techniques, use of more sophisticated bandwidth compression techniques, and variable bit-rate transmission of as little information as possible (i.e., by not transmitting data that do not necessarily require sending) for the purpose of reducing a total amount of information, more than with transmission at fixed bit rate. In order to accommodate such calls in an efficient manner, therefore, it will be required to utilize the statistical multiplexing effect like the ATM system.

In the network of the present invention, there are some delays between the moment that a request for a time slot occurs and the moment that it is set up even if the setup goes smoothly. It is not also possible that a time slot request is always accepted. If, therefore, allocation of time slots were simply performed on the basis of the time-average bandwidth of each call in expectation of the statistical multiplexing effect, then no immediate measures could be taken against overflowing out of one time slot due to possible bandwidth variations. For this reason, it is preferable that delay priority and allowable discard rate be set up on calls. Consequently, even if time slot's overflowing is likely to occur as a result of a bandwidth variation, it will be avoided by discarding a portion of a call which is high in allowable discard rate or by forcing a call of low delay priority to wait from the issue of a new time slot request until it is serviced.

The network of the present invention is a network that has very high throughput originally. It may be considered that a large portion of the bandwidth remains unused. If so, it will be not unnecessary to perform statistical multiplexing by force resulting in the discarding. It is therefore desirable that quality classes be determined in advance, allocation of time slots based on the maximum bit rate be performed when the network has quite enough residual bandwidth, and such bandwidth allocation as utilizes the statistical multiplexing effect be performed when the network becomes crowded and thus the loss of calls is likely to occur. In this case, the bandwidths may be crammed simply at the average bit rate, however, for calls that never permit to be discarded, bandwidths should be secured at the maximum bit rate as before. For other calls, the statistical multiplexing is performed.

When the statistical multiplexing is performed in this way, on the one hand, the bandwidth may instantly overflow one time slot and on the other hand, the bandwidth may be decreased more than the average. If a class were provided within the quality classes which permits retransmission without caring about delays to thereby keep the discard rate low, a call within that class could be saved in a buffer in case of insufficiency of bandwidth and be transmitted at the time when the bandwidth is enough.

Figure 39:
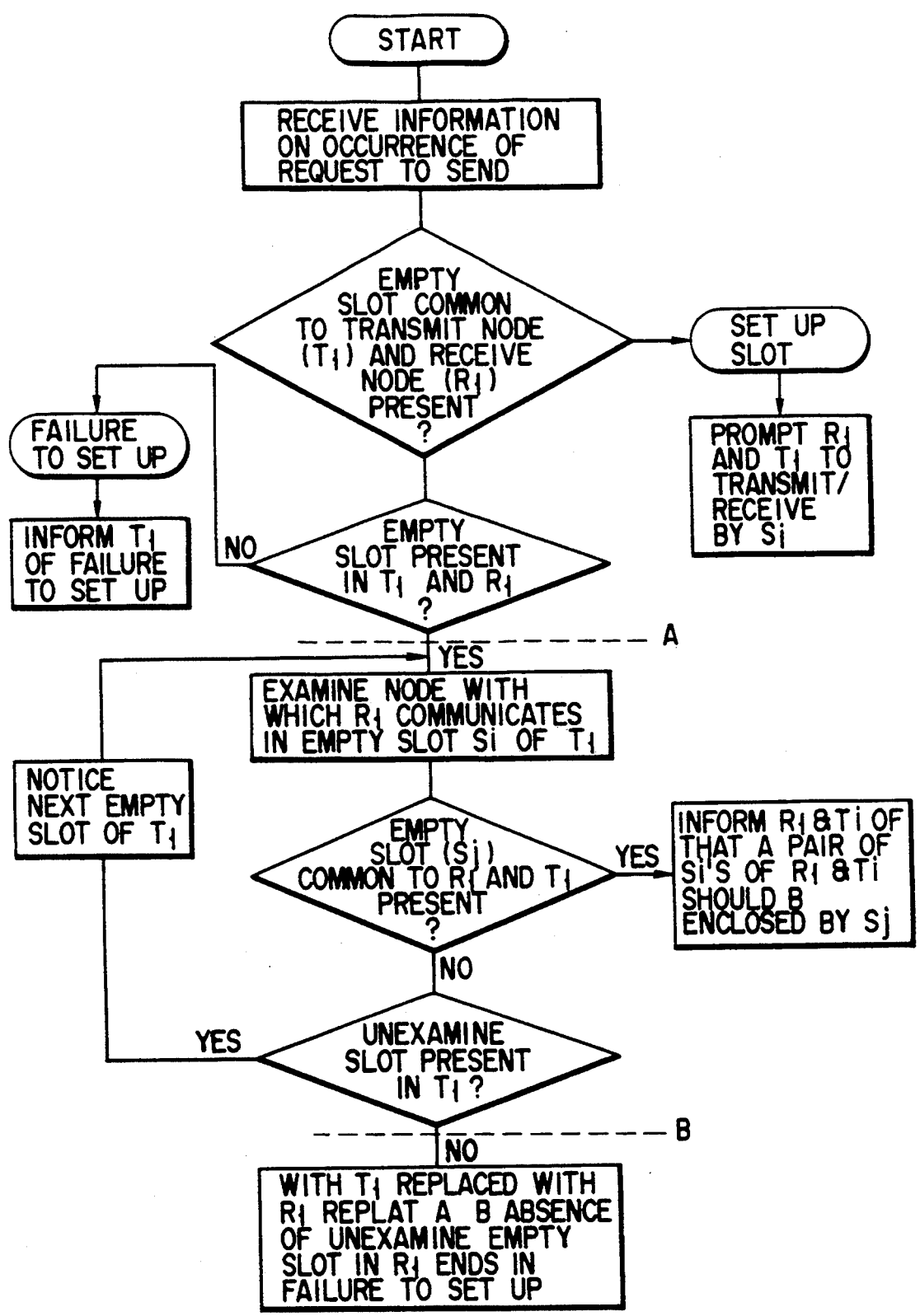
FIG. 39 illustrates an example of a procedure of arranging and shifting time slots in a communication network according to a twenty-fourth embodiment of the present embodiment.

An example of a procedure of rearranging and shifting time slots when no empty time slot common to a transmission node and a reception node can be found in the non-broadcasting, normal slot setup procedure will be described in detail with reference to FIGS. 39 and 40.

First, the number of empty time slots is examined for each of a transmission node and a reception node. If either the transmission node or the reception node or both have not any empty time slot, a new time slot cannot be set up. The setup of a time slot thus ended in failure. The network controller informs this fact of a node that is presenting the request for setup.

Next, where each node has some empty time slots, attention is paid to a certain empty time slot Si of either of the transmission node (T1) and reception node (R1), the transmission node T1 first taken here by way of example. Then, the node transmitting to R1 in that time slot Si is searched. Assuming this node to be Ti, then Ti and R1 are examined for the presence of a common empty time slot. In the presence of a common empty time slot (assumed to be Sj), the transmission node T1 and the reception node R1 are allowed to have a common empty time slot because the time slot Si of the node R1 is emptied by shifting Ti-R1-communications from the time slot Si to the time slot Sj (FIG. 40). The network controller instructs the nodes R1 and Ti to shift communications in the slot Si to the slot Sj and the nodes T1 and R1 to perform communications in the slot Si. In the event that no common empty time slot of R1 and Ti can be found, the same procedure is performed for another empty time slot of the node T1. In case where a common empty time slot of the nodes T1 and R1 cannot be set up even if that procedure has been performed for all of empty time slots of the node T1, the same procedure is next performed for empty time slots of the node R1. If a common empty time slot cannot set up nevertheless, then the setup of a time slot will result in failure, which is presented to the requesting node.

In the above example, attention is paid to empty time slots of a transmission node or a reception node for rearranging time slots. If, when the network controller in the system has sufficient capabilities or when a call, which should be sent of high priority, the above procedure has failed, it would be possible to set up a time slot in another way. In the above example, by way of example, the same procedure can be used to examine if a common empty time slot of the nodes R1 and Ti can be set up, or time slots which are currently in use in the nodes T1 and R1 are examined whether each of them can be shifted to another time slot.

In the system that a common empty time slot is saved for broadcasting purpose, that time slot may be treated, at rearranging time slots, as being absent even if it is empty. In this case, only when the time slot setup results in failure as the result of that treatment, the use of that broadcasting time slot is temporarily permitted for transmission and reception. Thereafter, a procedure, to be described later, of rearranging time slots for broadcasting is preferably used to shift the communications from the broadcasting time slot as soon as possible.

Next, a procedure of rearranging and shifting time slots for broadcasting purpose will be described in detail. A procedure of shifting a pair of source and destination nodes allocated to a time slot that is required to be empty for broadcasting purpose to another time slot is performed. However, the procedure will not be effective unless it is performed at the time there is some change in time slot usage in comparison with at the time that pair was allocated to that time slot, or the rearranging procedure for broadcasting is wider in the range of examination than the normal call setting procedure.

First, the source-destination pair is examined for the presence of a common empty time slot. In the absence of it, a common empty time slot other than a broadcasting time slot is set up in accordance with the same procedure as the normal time slot setup procedure to thereby shift that pair.

The amount of computations required of the network controller depends on the extent to which examination is to be made for rearranging time slots. Thus, the extent of examination may depend on the load conditions of the system and the processing capabilities of the network controller. For example, in the case of mere examination for the availability of a common empty time slot, if it is not available, examination of whether the counter part of one of empty time slots is permitted to shift and examination of whether a common empty time slot can be set up by shifting any other time slot may be used properly.

As a section for performing processes of allocating time slots, etc., within the network controller, dedicated logic circuitry or a commercially available processor or computer may be used. In the latter case, software is needed to operate the computer. In this case, depending on the types of processing to be per formed (time slot arrangement, etc.), it will be needed to prepare some different types of software. It is also possible to allow the user to alter the system at his determination after its installation. A hybrid of dedicated logic circuitry and a processor can also be used. In this case, the logic circuitry may be dedicated to processes that are performed very frequently and require to be processed at high speed. The other processes may be carried out by the software that runs on the processor. In this case as well, the software can be set alterable.

Finally, a method of providing security for data in the optical communication system of the present invention will be described briefly. To provide data security, data may be cryptographed. As an alternative, the network controller may issue a control signal which controls receivers to switch between receiving data thereto. This prevents any receiver from being free to switch between channels. In addition to the embodiments described above, the present invention may be practiced and modified in various ways.

According to the present invention, for node-to-node communications in the time slots in the frames into which each optical transmission channel of a specific wavelength is divided, the network controller performs centralized control to determine which time slot should be used in relation to the node to which data is sent. Programmed with suitable rules for time slot allocation, the network controller allows fair, quick time slot allocation, allowing communications capable of guaranteeing the bandwidth and having high-throughput.

Even if a failure occurs in the network controller and its backup, provision for the capability of switching to the preassign system or the distributed control system upon detection of the failure will prevent the whole communication system from going down.

Moreover, by allowing the network controller to rearrange time slot allocation all the time or on occasions so that a receiving empty time slot may be set up in common to each node, a common receiving time slot can be set up immediately on all of reception nodes upon occurrence of a request for broadcast/multicast, even if each node is equipped with a single transmitter and a single receiver.

Furthermore, that there are provided twice or over as many time slots as there are nodes and there are time slots available in two or more sizes within a frame permits lower discard rate and higher throughput to be attained. In addition, the distribution of clocks for synchronizing the data rate within the network by the network controller eliminates the need for the provision of a clock-only channel and a clock-only receiver. The path identifier management and allocation by the network controller and the channel identifier management and allocation by each general node alleviate the burden of network implementation imposed on the network controller. Further, independently-made path identifier allocation and time slot allocation facilitate the arrangement and management of time slots.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A communication system comprising:
   a wavelength multiplexing network having a plurality of transmission channels of different wavelengths;
   a plurality of nodes interconnected by said wavelength multiplexing network, each of said nodes making data transmission and reception in time slots, into which time on each of said transmission channels is divided, with transmitting wavelength being fixed and unique to a node and receiving wavelength being tunable;
   a network controller for centrally controlling time slot allocation to said plurality of nodes; and
   a communication means for connecting said network controller to said multiplexing network and said nodes so as to be able to be communicated with said networks and said nodes therethrough.

2. The communication system according to claim 1, in which said network comprises a plurality of communication cables respectively coupled to said nodes and a passive coupler unit for interconnecting said nodes in a star configuration by said communication cables.

3. The communications system according to claim 1, in which said network controller centrally controls the time slot allocation repeated for each frame, for performing transmission and reception for each frame including a predetermined number of time slots.

4. An optical communication system for performing transmission and reception for each frame including a predetermined number of time slots, comprising:
   a wavelength multiplexing optical network having a plurality of optical transmission channels of different wavelengths;
   a plurality of nodes interconnected by said wavelength multiplexing optical network, each node making data transmission and reception with transmitting wavelength fixed and receiving wavelength set tunable in time slots into which time on each of said optical transmission channels is divided; and
   a network controller for centrally controlling time slot allocation repeated for each frame to said plurality of nodes; and
   a communication means for connecting said network controller to said multiplexing network and said nodes so as to be able to be communicated with said networks and said nodes therethrough.

5. The optical communication system according to claim 4, in which said optical network is a passive star network which includes a plurality of optical fiber cables respectively coupled to said nodes and a star coupler for interconnecting said nodes in a star configuration by said optical fiber cables.

6. The optical communication system according to claim 4, further comprising:
   data channels for data transmission; and
   control channels provided independently for transmitting control signals which include a signal to notify said network controller of a request for transmission by each of said nodes and a signal from said network controller to notify each node of a determination of time slot allocation by said network controller.

7. The optical communication system according to claim 6, in which said network controller is coupled to at least one of a public network or a device having clocks synchronized with said public network, said clocks being distributed to said nodes coupled to said optical communication network over said control channel.

8. The optical communication system according to claim 4, further comprising:
   failure detecting means for detecting a failure in said network controller; and
   means for, when a failure in said network controller is detected by said failure detecting means, switching the time slot allocation to said nodes to either a preassigned-slot-allocation system in which said nodes make transmission and reception in time slots which have been scheduled in advance or a distributed-slot-allocation control system in which the time slot allocation to said nodes is determined by said nodes themselves.

9. The optical communication system according to claim 4, in which said network controller arranges said time slot allocation so that an empty time slot for reception can be reserved in common for all of said nodes, if needed.

10. The optical communication system according to claim 4, further comprising a relay node coupled to said optical wavelength multiplexing network, for performing connectionless data communications wherein data communications among said nodes are indirectly performed via said relay node.

11. The optical communication system according to claim 10, in which said connectionless data communications are performed in an empty time slot that is the remainder of time slots in use.

12. The optical communication system according to claim 4, in which the number of time slots within a frame is selected to be at least twice the number of nodes.

13. The optical communication system according to claim 4, in which a frame includes two or more types of time slots having different durations.

14. An optical communication system for performing transmission and reception for each frame including a predetermined number of time slots, comprising:
   a wavelength multiplexing network having a plurality of transmission channels of different wavelengths;
   a plurality of nodes interconnected by said wavelength multiplexing network, each node making data transmission and reception with transmitting wavelength fixed and receiving wavelength set tunable in time slots in which time on each of said transmission channels are divided;
   a network controller for centrally controlling time slot allocation repeated for each frame to said plurality of nodes;
   data channels for data transmission; and
   control channels provided independently between said network controller and each of said nodes, for transmitting control signals which include a signal to notify said network controller of a request for transmission by each of said nodes and a signal from said network controller to notify each node of a determination of time slot allocation by said network controller.

15. An optical communication system for performing transmission and reception for each frame including a predetermined number of time slots, comprising:

a wavelength multiplexing network having a plurality of transmission channels of different wavelengths;

a plurality of nodes interconnected by said wavelength multiplexing network, each node making data transmission and reception with transmitting wavelength fixed and receiving wavelength set tunable in time slots into which time on each of said transmission channels are divided;

a network controller connected to said wavelength multiplexing network and said nodes, for centrally controlling time slot allocation repeated for each frame to said plurality of nodes;

failure detecting means connected to said wavelength multiplexing network for detecting a failure in said network controller; and means connected to said wavelength multiplexing network for, when a failure in said network controller is detected by said failure detecting means, switching the time slot allocation to said nodes to either a preassigned-slot-allocation system in which said nodes make transmission and reception in time slots which have been scheduled in advance or a distributed-slot-allocation control system in which time slot allocation to said nodes is determined by said nodes themselves.

* * * * *